United States Patent
Koinuma et al.

(10) Patent No.: US 8,856,588 B2
(45) Date of Patent: Oct. 7, 2014

(54) INFORMATION PROCESSING APPARATUS, CONTROL METHOD, AND COMPUTER-READABLE RECORDING MEDIUM

(75) Inventors: Hideyuki Koinuma, Yokohama (JP); Hiroyuki Izui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 162 days.

(21) Appl. No.: 13/597,428

(22) Filed: Aug. 29, 2012

(65) Prior Publication Data

US 2013/0227224 A1  Aug. 29, 2013

(30) Foreign Application Priority Data

Feb. 29, 2012  (JP) .................................. 2012-044848

(51) Int. Cl.
*G06F 11/00* (2006.01)

(52) U.S. Cl.
USPC ............................. 714/6.1; 711/152; 711/153

(58) Field of Classification Search
USPC ......................................................... 714/6.1
See application file for complete search history.

(56) References Cited

U.S. PATENT DOCUMENTS

| | | | |
|---|---|---|---|
| 6,148,377 A * | 11/2000 | Carter et al. ................... | 711/147 |
| 6,742,145 B2 | 5/2004 | Bailey et al. | |
| 7,650,467 B2 | 1/2010 | Blinick et al. | |
| 7,774,645 B1 * | 8/2010 | Clark et al. ...................... | 714/12 |
| 8,489,829 B2 * | 7/2013 | Aronovich et al. ........... | 711/161 |
| 2007/0220313 A1 * | 9/2007 | Katsuragi et al. ................. | 714/6 |
| 2008/0184365 A1 | 7/2008 | Matsushita | |
| 2009/0132876 A1 | 5/2009 | Freking et al. | |
| 2011/0161619 A1 * | 6/2011 | Kaminski et al. ............. | 711/207 |
| 2011/0161620 A1 * | 6/2011 | Kaminski et al. ............. | 711/207 |
| 2012/0036412 A1 * | 2/2012 | Sugawara ...................... | 714/758 |

FOREIGN PATENT DOCUMENTS

| | | |
|---|---|---|
| JP | 61-195444 | 8/1986 |
| JP | 8-77078 | 3/1996 |
| JP | 9-128303 | 5/1997 |
| JP | 11-175409 | 7/1999 |
| JP | 2002-312340 | 10/2002 |
| JP | 2008-522264 | 6/2008 |
| JP | 2008-186429 | 8/2008 |
| JP | 2009-244994 | 10/2009 |

OTHER PUBLICATIONS

Korean Office Action for corresponding Korean Application 10-2012-0115353; dated Sep. 27, 2013.
Extended European Search Report mailed Oct. 29, 2013 in corresponding European Application No. 12188300.3.
Japanese Office Action mailed Feb. 4, 2014 in corresponding Japanese Application No. 2012-044848.

* cited by examiner

*Primary Examiner* — Kamini Patel
(74) *Attorney, Agent, or Firm* — Staas & Halsey LLP

(57) ABSTRACT

At least one node of a plurality of nodes in an information processing apparatus executes the following processing for data included in a memory of one node or other nodes and stored in a shared memory area which the node and the other nodes access. That is, the node detects an ICE which occurs over a predetermined number of times within a predetermined time or a PCE which occurs at a single location in the shared memory area. When the error is detected, the node performs control to prevent the node and the other nodes from accessing the shared memory. The node recovers the data in a memory area different from the shared memory area. The node notifies information about the different memory area to the other nodes. The node performs control to resume the access to the data from the node and the other nodes.

12 Claims, 31 Drawing Sheets

| ADDRESS | VALID | NODE ID | CPU ID |
|---------|-------|---------|--------|
| #0 | 1 | 1 | 4 |
| #1 | 1 | 1 | 5 |
| #2 | 0 |   |   |

| AVERAGE VALUE (TIMES/MINUTE) | START TIME | FINAL OCCURRENCE TIME |
|---|---|---|
| 0.1 | 2011/1/1 00:00 | 2011/1/1 03:30 |

FIG.22

| AVERAGE VALUE (TIMES/MINUTE) | START TIME | FINAL OCCURRENCE TIME |
|---|---|---|
| 0.095 | 2011/1/1 00:00 | 2011/1/1 03:50 |

FIG.23

| AVERAGE VALUE (TIMES/MINUTE) | START TIME | FINAL OCCURRENCE TIME |
|---|---|---|
| 0 | 0 | 0 |

FIG.24

| AVERAGE VALUE (TIMES/MINUTE) | START TIME | FINAL OCCURRENCE TIME |
|---|---|---|
| 1 | 2011/1/1 00:00 | 2011/1/1 00:00 |

FIG.25

| AVERAGE VALUE (TIMES/MINUTE) | START TIME | FINAL OCCURRENCE TIME |
|---|---|---|
| 0.4 | 2011/1/1 00:00 | 2011/1/1 00:05 |

FIG.26

| AVERAGE VALUE (TIMES/MINUTE) | START TIME | FINAL OCCURRENCE TIME |
|---|---|---|
| 0.1 | 2011/1/1 00:00 | 2011/1/1 03:30 |

FIG.27

| AVERAGE VALUE (TIMES/MINUTE) | START TIME | FINAL OCCURRENCE TIME |
|---|---|---|
| 1 | 2011/1/1 05:30 | 2011/1/1 05:30 |

FIG.28B

| ADDRESS | PA RANGE | DA→PA CONVERTING EQUATION | PA→DA CONVERTING EQUATION |
|---|---|---|---|
| #0 | 0x0000-0x3fff | PA=DA | DA=PA |
| #1 | 0x4000-0x7fff | PA=DA+0x4000 | DA=PA-0x4000 |

FIG.28C

| INTER-NODE SHARED MEMORY PA | INTER-NODE SHARED MEMORY VA | INTER-NODE SHARED MEMORY LENGTH | USING NODE INFORMATION | POINTER TO NEXT ENTRY |
|---|---|---|---|---|

FIG.34

| ACCESS STOP FLAG | I/O PROCESSING LOCK | POINTER TO ANOTHER PAGE MANAGEMENT TABLE | POINTER TO ADDRESS CONVERSION TABLE | OTHER MANAGEMENT INFORMATION |
|---|---|---|---|---|

FIG.35

| VA | PA | AREA LENGTH | POINTER TO PAGE MANAGEMENT TABLE | POINTER TO ANOTHER ADDRESS CONVERSION TABLE | OTHER MANAGEMENT INFORMATION |
|---|---|---|---|---|---|

FIG.37

| PROCESS IDENTIFIER | PROCESS RECOVERY INFORMATION | RESUMPTION WAITING SHARED MEMORY ADDRESS | pointer TO NEXT LIST |
|---|---|---|---|

FIG.38

| PROCESS IDENTIFIER | PROCESS RECOVERY INFORMATION | pointer TO NEXT LIST |
|---|---|---|

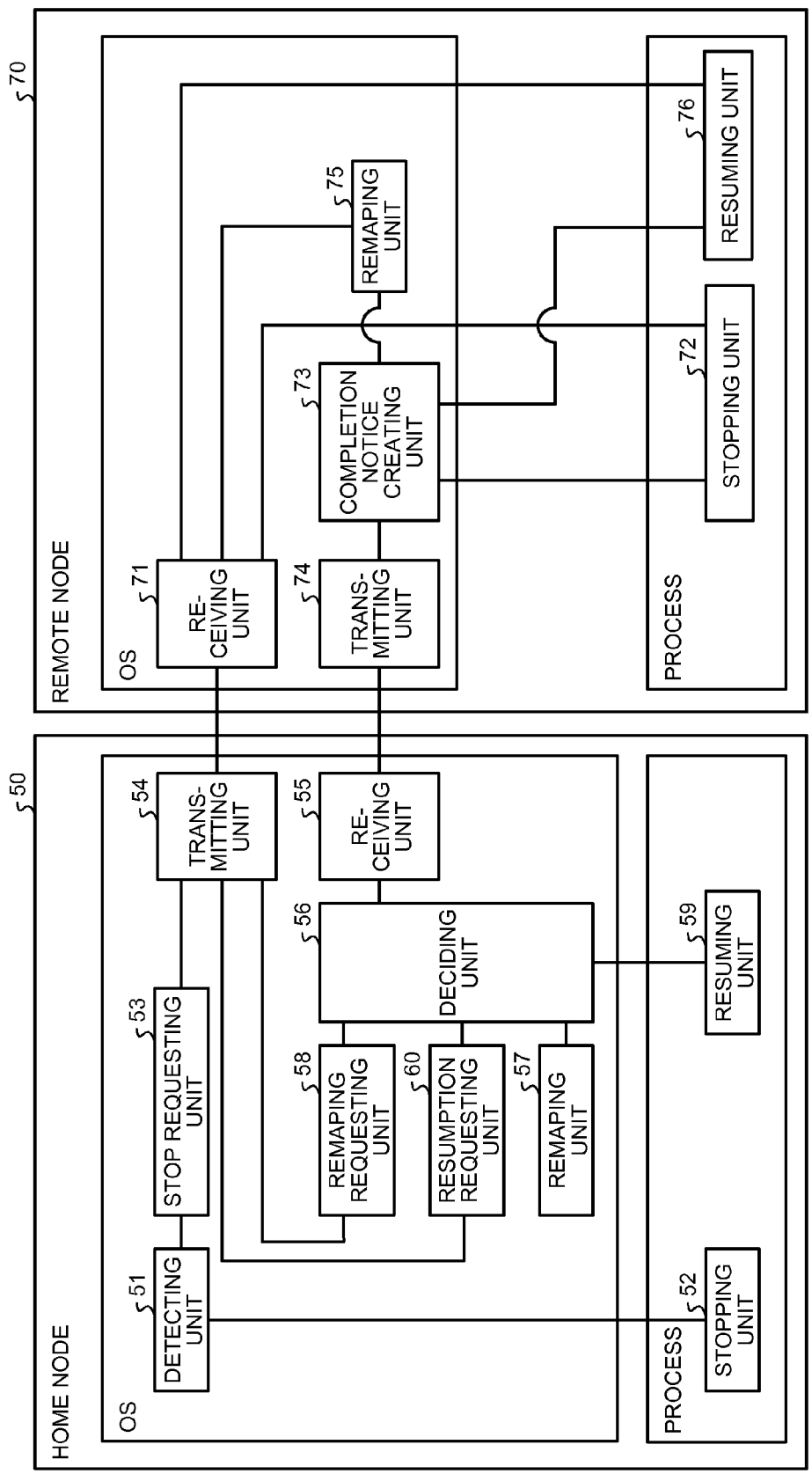

INFORMATION PROCESSING APPARATUS, CONTROL METHOD, AND COMPUTER-READABLE RECORDING MEDIUM

CROSS-REFERENCE TO RELATED APPLICATION

This application is based upon and claims the benefit of priority of the prior Japanese Patent Application No. 2012-044848, filed on Feb. 29, 2012, the entire contents of which are incorporated herein by reference.

FIELD

The embodiments discussed herein are directed to an information processing apparatus, a control method, and a control program.

BACKGROUND

Conventionally, a technique of SMP (Symmetric Multi-Processor) in which a plurality of computation processing devices shares a storage device is known. An example of an information processing system to which such an SMP technique is applied is an information processing system (information processing apparatus) which connects a plurality of nodes which have each a computation processing device and a storage device through a single bus, and in which each computation processing device shares each storage device. That is, this information processing system has a storage device (shared memory) shared between a plurality of nodes.

An ECC ICE (Error Check and Correct Intermittent Correctable Error) or an ECC PCE (Permanent Correctable Error) occurs in data of such a shared memory. Meanwhile, "ECC ICE" is an intermittent correctable error. That is, "ECC ICE" is a correctable error which occurs over a predetermined number of times within a predetermined time. Further, "ECC PCE" is a fixed correctable error. That is, "ECC PCE" is a correctable error which occurs at a single location in a memory area.

Further, there is a technique of, when error correction is frequently performed in a given page, copying to a second memory area content of the page from a first memory area which includes a location at which an error is corrected, and writing a physical page in a TLB from an address of the first memory area to an address of the second memory area.

Furthermore, there is a technique of, when correctable one bit error occurs upon an access to the shared memory, while a given device writes back data, preventing another device from accessing a memory which the given device is accessing.

Patent Document 1: Japanese Laid-open Patent Publication No. 11-175409
Patent Document 2: Japanese Laid-open Patent Publication No. 09-128303
Patent Document 3: Japanese Laid-open Patent Publication No. 08-077078

However, the above techniques have a problem that, if a CE such as an ICE or a PCE is left on memory, an information processing apparatus goes down in some cases, such as soft error happened to memory space where ICE or PCE already exists.

SUMMARY

According to an aspect of an embodiment, an information processing apparatus including a plurality of nodes that each comprise a storage device, and an interconnect that connects between the plurality of nodes, wherein at least one node of the plurality of nodes includes a detecting unit that detects a correctable error in data stored in a shared memory area included in a storage device of the one node or other node, the shared memory area being an area to which the one node and the other node access, and the correctable error being (i) an error which occurs more than a predetermined number of times within a predetermined time period or (ii) an error which occurs at a single location in the shared memory area, a prevention control unit that, when the detecting unit detects the correctable error, performs control to prevent the one node and the other node from accessing the shared memory area, a recovering unit that recovers the data stored in the shared memory area in a memory area different from the shared memory area, a notifying unit that notifies information about the different memory area to the other node, and a resumption control unit that performs control to resume the access to the recovered data from the one node and the other node.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 21 is a view for explaining an example of processing of detecting occurrence of an ICE executed by the ECC checking unit;

FIG. 22 is a view for explaining an example of processing of detecting occurrence of an ICE executed by the ECC checking unit;

FIG. 23 is a view for explaining an example of processing of detecting occurrence of an ICE executed by the ECC checking unit;

FIG. 24 is a view for explaining an example of processing of detecting occurrence of an ICE executed by the ECC checking unit;

FIG. 25 is a view for explaining an example of processing of detecting occurrence of an ICE executed by the ECC checking unit;

FIG. 26 is a view for explaining an example of processing of detecting occurrence of an ICE executed by the ECC checking unit;

FIG. 27 is a view for explaining an example of processing of detecting occurrence of an ICE executed by the ECC checking unit;

FIG. 28B is a view illustrating an example of a data configuration of a table referred to in processing of the OS;

FIG. 28C is a view illustrating an example of the data configuration of the table referred to in the processing of the OS;

FIG. 34 is a view illustrating an example of a data configuration of a memory management table;

FIG. 35 is a view illustrating an example of a data configuration of an address conversion table;

FIG. 37 is a view illustrating an example of a data configuration of an access resumption waiting list;

FIG. 38 is a view illustrating an example of a data configuration of a schedule waiting list;

FIG. 40 is a view illustrating an example of a functional configuration of the OS and process executed by the CPU according to the embodiment.

DESCRIPTION OF EMBODIMENT

Preferred embodiments of the present invention will be explained with reference to accompanying drawings.

Figure 1:
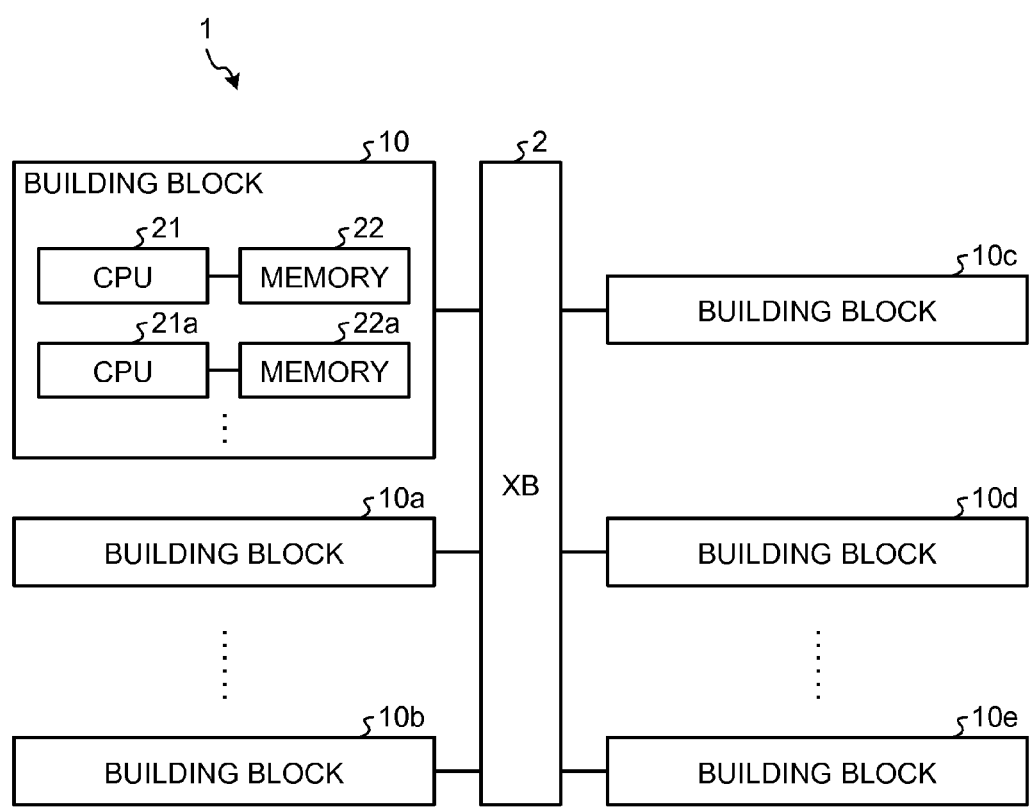
FIG. 1 is a view for explaining an example of an information processing system according to an embodiment.

An example of an information processing system which has a plurality of nodes will be described with a following embodiment using FIG. 1. FIG. 1 is a view for explaining an example of the information processing system according to the embodiment. With an example illustrated in FIG. 1, an information processing system 1 has an XB (cross bar switch) 2 and a plurality of building blocks 10 to 10e. The XB 2 is a cross bar switch which mutually connects each of the building blocks 10 to 10e. Further, the XB 2 has a service processor which is not illustrated and which serves as a master of each service processor of each of the building blocks 10 to 10e described below. In addition, in case of a small scale configuration where a small number of nodes are connected, building blocks may be directly connected without the XB 2.

Further, the building block 10 has a plurality of CPUs (Central Processing Units) 21 to 21c and a plurality of memories 22 to 22c. Furthermore, the other building blocks 10a to 10e also employ the same configuration as the building block 10 and therefore will not be described below. In addition, with the example illustrated in FIG. 1, the CPUs 21b and 21c and the memories 22b and 22c are not depicted. Further, an I/O (Input Output) device which is not illustrated is provided in each building block. Meanwhile, with the present example, cache coherence control between CPUs is realized by a directory system, and a home CPU which is described below and which has data on a memory manages this directory.

Each of the building blocks 10 to 10e independently operates an OS. That is, each of the CPUs 21 to 21c independently executes the OS. The OS executed by each of the building blocks 10 to 10e operates in a partition which is different per building block. Meanwhile, the partition refers to a group of building blocks in which the same OS operates and one system when seen from the operating OS operates.

For example, the building blocks 10 and 10a operate as a partition #A, and the building blocks 10b to 10d operate as a partition #B. In this case, the OS operated by the building block 10 identifies the building blocks 10 and 10 as one operating system, and the OS operated by the building block 10b identifies the building blocks 10b to 10d as one operating system.

Figure 2:
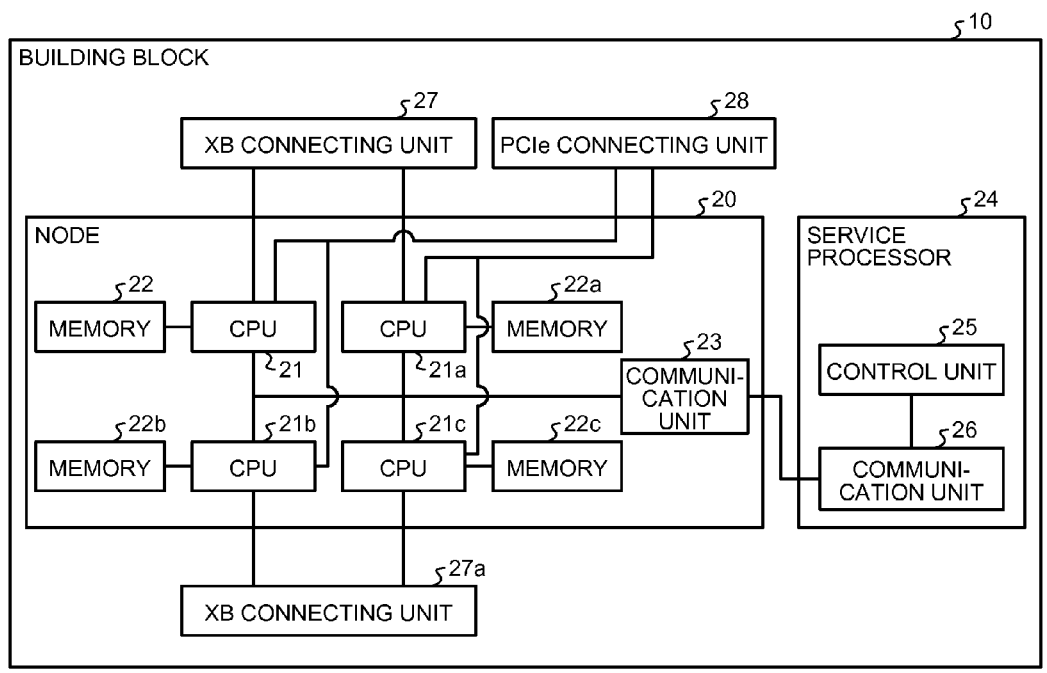
FIG. 2 is a view for explaining a functional configuration of a building block according to the embodiment.

Next, a configuration example of the building block will be described using FIG. 2. FIG. 2 is a view for explaining the functional configuration of the building block according to the embodiment. With an example illustrated in FIG. 2, the building block 10 has a node 20, a service processor 24, XB connecting units 27 and 27a and a PCIe (Peripheral Component Interconnect Express) connecting unit 28.

The node 20 has a plurality of CPUs 21 to 21c, a plurality of memories 22 to 22c and a communication unit 23.

The service processor 24 has a control unit 25 and a communication unit 26. Further, with the example illustrated in FIG. 2, each of the CPU 21 to 21c is mutually connected, and is connected with the communication unit 23. Further, the memories 22 to 22c are connected with the CPUs 21 to 21c, respectively. The service processor 24 connects to a manager terminal of a server through a network such as a LAN (Local Area Network) which is not illustrated, and performs control to change various settings in the node or the building block 10 in response to an instruction from the manager terminal.

Further, each of the CPU 21 to 21c is connected with the XB connecting unit 27 or the XB connecting unit 27a. In addition, the XB connecting units 27 and 27a may be the same XB connecting unit. Further, each of the CPUs 21 to 21c is connected with the PCIe connecting unit 28. Furthermore, the communication unit 23 is connected with the communication unit 26 of the service processor 24. In addition, the control unit 25, the communication unit 26, the communication unit 23 and each of the CPUs 21 to 21c are connected through, for example, an I²C (Inter-Integrated Circuit).

The CPUs 21 to 21c are computation processing devices which execute applications. Further, the CPUs 21 to 21c are connected with the memories 22 to 22c, respectively. Furthermore, when an application which is executed requests an allocation of a shared memory, each of the CPUs 21 to 21c mutually communicates, and allocates the shared memory used by the application. Still further, each of the CPUs 21 to 21c uses each of the memories 22 to 22c or part of the memories of the other building blocks 10a to 10e as a shared memory.

Figure 3:
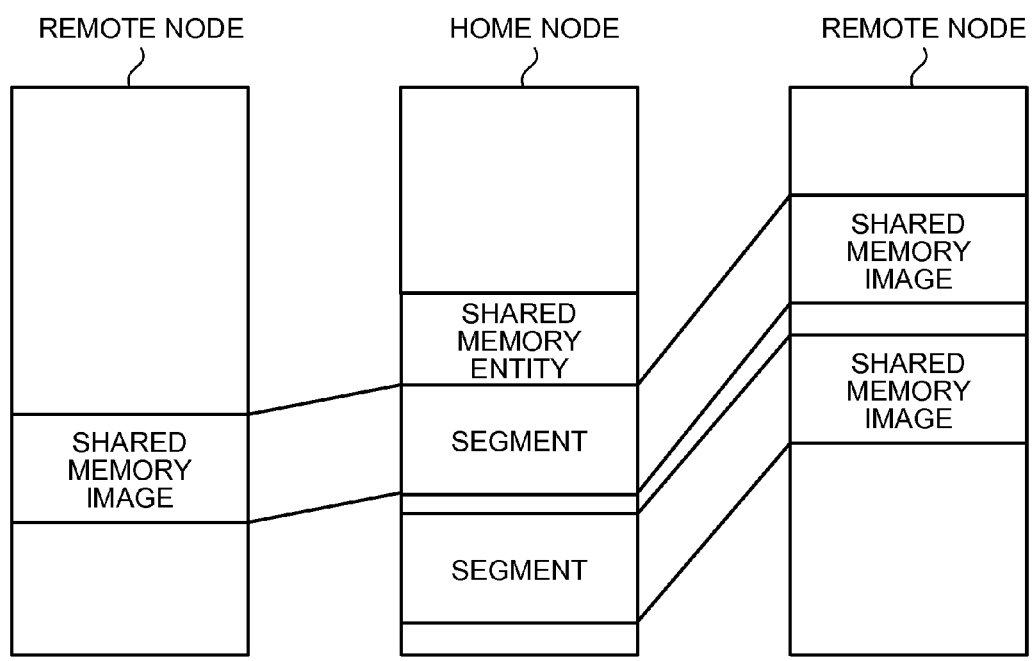
FIG. 3 is a view illustrating an example of a memory map when another node attaches to a node to which a shared memory is allocated.

FIG. 3 is a view illustrating an example of a memory map when another node attaches to a node to which a shared memory entity is allocated. With an example in FIG. 3, when the shared memory is allocated to a node (referred to as a "home node") which is directly connected to a physical memory where the shared memory exists, the home node divides the shared memory into a certain area size. Although this division unit is referred to as a "segment", it is not indispensable to divide the shared memory into segments. When another node requests an allocation of the shared memory which the home node has, it is possible to use the shared memory of the home node by attaching the shared memory. A memory area used by this remote node is referred to as a "shared memory image area". This shared memory image area may be attached by a single remote node or a plurality of remote nodes.

Back to FIG. 2, each of the CPUs 21 to 21c has a node map which associates a physical address of the memory and a CPUID (identification) which is an identifier of the CPU connected with the memory. In addition, this CPUID is uniquely determined by the system 1 and does not overlap.

Each of the CPUs 21 to 21c communicates with another CPU using the node map. When, for example, a CPUID associated with an access target physical address indicates a CPU different from the CPUs 21 to 21c, the CPU 21 transmits a memory access request to another node through the XB connecting unit 27 or the XB connecting unit 27a and the XB 2. Further, when receiving a request for a memory connected with the CPU 21 from another node, the CPU 21 reads request target data from the memory 22 connected with the CPU 21, and transmits the data to a request source. The other CPUs 21a to 21c also perform the same processing.

Further, each of the CPUs 21 to 21c has a function of converting an address using a TLB (Translation Lookaside Buffer), and, when a TLB miss occurs, executing the same processing as in conventional CPUs such as trap processing.

The memories 22 to 22c are memories shared by all CPUs of the information processing system 1. Further, in the information processing system 1, the service processor of each of the building blocks 10 to 10e sorts a physical address mapped to an identical physical address space, to the memories of all building blocks 10 to 10e. That is, physical addresses having values which do not value are allocated to memories which are used as at least shared memories among all memories of the information processing system 1.

Further, the memories 22 to 22c use part of a memory area as a shared area which all CPUs of the information processing system 1 share, and use the other part as a local area in which the CPUs 21 to 21c accessing the memories 22 to 22c store kernel data and user data and an I/O area which is irrelevant upon an exchange with another node through the shared memory and which is used by the I/O device.

The control unit 25 controls the building block 10. For example, the control unit 25 manages a power source of the building block 10, or monitors and controls an abnormality in the building block 10. Further, the control unit 25 is connected with service processors of the other building blocks 10a to 10e through a network which is not illustrated, and executes control coordinated between the building blocks 10a and 10e. Furthermore, the control unit 25 can communicate with the OS executed by each of the CPUs 21 to 21c.

Still further, the control unit 25 accesses each of the CPUs 21 to 21c through the communication unit 26 and the communication unit 23. Moreover, the control unit 25 updates and controls the node map of each of the building blocks 10 to 10e.

In addition, the communication unit 26 of the service processor 24 receives a control signal transmitted from the control unit 25, and transmits the received control signal to the communication unit 23 of the node 20. Further, the communication unit 23 receives the control signal transmitted from the communication unit 26, and transmits the received control signal to each of the CPUs 21 to 21c. Furthermore, the XB connecting units 27 and 27a connect each of the CPUs 21 to 21a with the XB 2, and relays communication between the CPUs of the building blocks 10 to 10e. Still further, the PCIe connecting unit 28 relays an access to the I/O device through the CPUs 21 to 21c.

Figure 4:
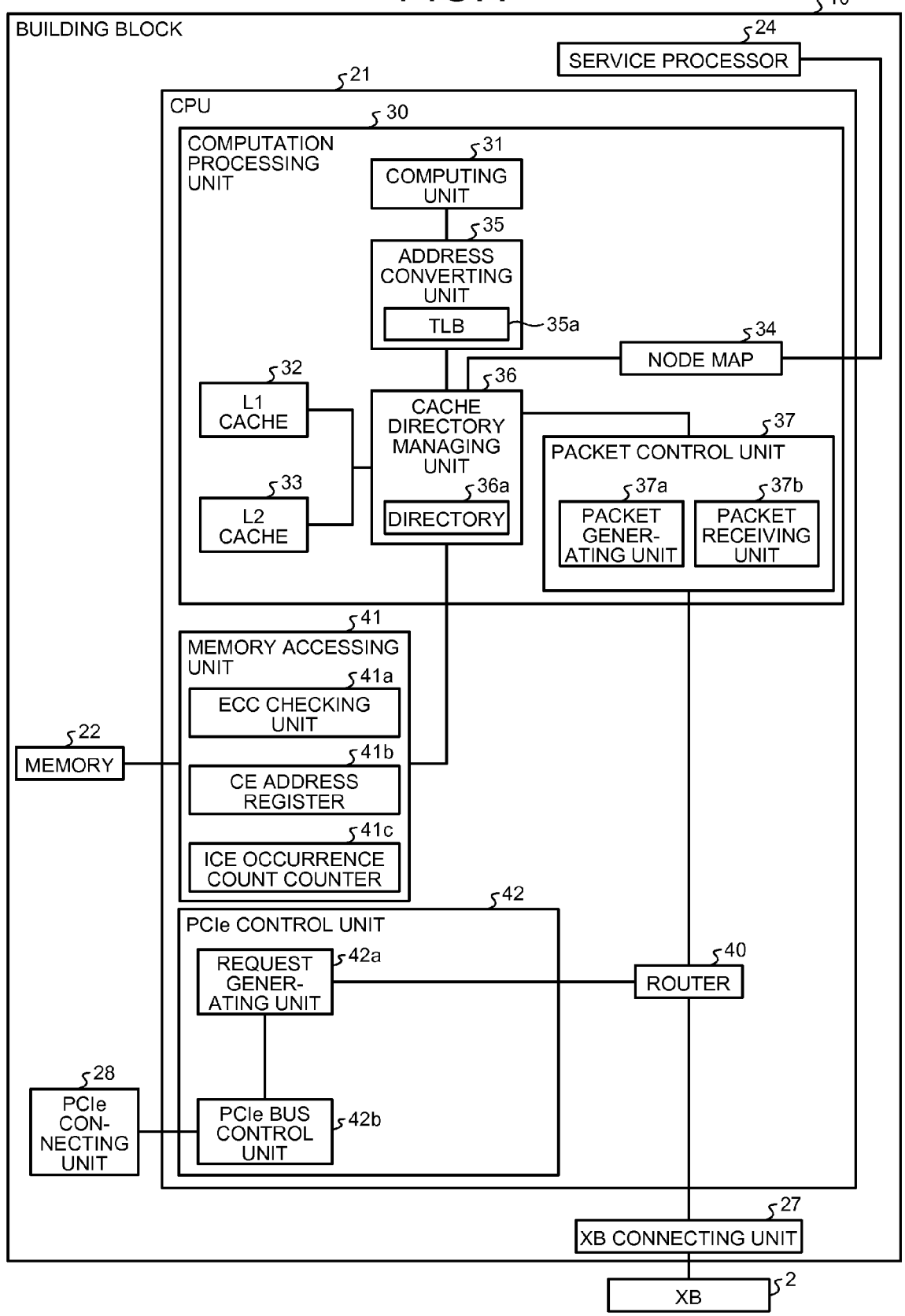
FIG. 4 is a view for explaining a functional configuration of a CPU according to the embodiment.

Next, a functional configuration of each of the CPUs 21 to 21c will be described using FIG. 4. FIG. 4 is a view for explaining the functional configuration of the CPU according to the embodiment. In addition, the CPUs 21a to 21c have the same function as in the CPU 21, and therefore will not be described. Further, with an example illustrated in FIG. 4, the communication units 23 and 26 which connect the service processor 24 and the CPU 21 are not illustrated.

With the example illustrated in FIG. 4, the CPU 21 has a computation processing unit 30, a router 40, a memory accessing unit 41 and a PCIe control unit 42. Further, the computation processing unit 30 has a computing unit 31, an L1 (Level 1) cache 32, an L2 (Level 2) cache 33, a node map 34, an address converting unit 35, a cache directory managing unit 36 and a packet control unit 37. In addition, each unit of the router 40, the memory accessing unit 41 and the PCIe control unit 42 is not necessary to be included inside the single CPU 21.

Further, the packet control unit 37 has a packet generating unit 37a and a packet receiving unit 37b. Furthermore, the PCIe control unit 42 has a request generating unit 42a and a PCIe bus control unit 42b.

First, the node map 34 of the computation processing unit 30 will be described. The node map 34 is a table in which a range of a physical address indicating a memory area of a memory and a CPUID of a CPU connected with the memory. An example of information registered in the node map 34 will be described using drawings.

Figures 5, 6:
FIG. 5 is a view for explaining an example of a data configuration of a node map according to the embodiment.
FIG. 6 is a view for explaining a packet transmitted from the CPU according to the embodiment.

FIG. 5 is a view for explaining an example of a data configuration of a node map according to the embodiment. With an example illustrated in FIG. 5, the node map 34 has an entry which associates registration content of items such as "address", "valid", "node ID" and "CPUID". Meanwhile, in an item of "address" of each entry, information showing an address area including a plurality of continuous physical addresses is stored.

For example, the information processing system 1 divides a physical address space sorted to all memories into address areas of equal sizes, and assigns an identifier such as #0, #1 and #2 to each address area. Further, the information processing system 1 registers the identifier indicating each address area in "address" of each entry of the node map 34. FIG. 5 illustrates, for example, a case where the identifier #0 is registered in the item of "address" of the first entry. Further, FIG. 5 illustrates, for example, a case where the identifier #1 is registered in the item of "address" of the second entry. Furthermore, FIG. 5 illustrates, for example, a case where the identifier #2 is registered in the item of "address" of the third entry.

Still further, in an item of "valid" of each entry, a valid bit is registered which indicates whether or not each CPU can access a memory area indicated by a physical address. When, for example, a memory area indicated by the physical address is a shared area shared between the CPUs, a valid bit (for example, "1") which indicates that each CPU can access the memory area is registered. FIG. 5 illustrates, for example, a case where the valid bit "1" is registered in the item of "valid" of the first entry. Further, FIG. 5 illustrates, for example, a case where the valid bit "1" is registered in the item of "valid" of the second entry. Furthermore, FIG. 5 illustrates, for example, a case where a valid bit "0" which indicates that each CPU may not access a memory area indicated by a physical address is registered in the item of "valid" of the third entry.

Still further, in an item of "node ID" of each entry, an identifier is registered which indicates a node with a memory to which a physical address is sorted. FIG. 5 illustrates, for example, a case where an identifier "1" indicating a node is registered in the item of "node ID" of the first entry. Further, FIG. 5 illustrates, for example, a case where the identifier "1" indicating the node is registered in the item of "node ID" of the second entry.

Furthermore, in an item of "CPUID" of each entry, an identifier is registered which indicates a CPU connected with a memory to which a physical address is sorted. That is, the node map 34 indicates that an access target physical address is a physical address of a memory connected with which CPU. FIG. 5 illustrates, for example, a case where an identifier "4" indicating the CPU is registered in the item of "CPUID" of the first entry. Further, FIG. 5 illustrates, for example, a case where an identifier "5" indicating the CPU is registered in the item of "CPUID" of the second entry.

In addition, as long as it is possible to indicate that the access target physical address is a physical address connected with which CPU, information may be registered in the node map 34 in an arbitrary format other than the format of the present example.

Back to FIG. 4, the computing unit 31 is a core of a computing device which executes computation processing, and executes an OS (Operating System) and applications. Further, when reading or writing data, the computing unit 31 outputs to the address converting unit 35 a virtual address (VA) of a memory area which stores data which is a read target or a write target.

The L1 cache 32 is a cache memory which temporarily stores data which is frequently used in the computing unit 31. Although the L2 cache 33 temporarily stores data which is frequently used similar to the L1 cache 32, the L2 cache 33 is a cache memory which reads and writes data at a low speed. Meanwhile, directory information 36a is stored in the cache directory managing unit 36, and is information which indicates update statuses of CPUs in which data stored in each memory area of the memory 22 is cached or cached data. In the following description, "directory information" is simply referred to as "directory" in some cases. A cache memory managing method based on this directory is a technique which is frequently used in a ccNUMA (Cache Coherent Non-Uniform Memory) system. The ccNUMA technique and the directory technique are both known techniques, and therefore will not be described in detail. Further, although the directory 36a is built in the cache directory managing unit 36 in FIG. 4, it is also possible to record the directory information 36a in part of the memory area of the memory 22.

The address converting unit 35 has a TLB 35a. In the TLB 35a, an entry which associates a virtual address and a physical address is registered. The address converting unit 35 converts a virtual address outputted from the computing unit 31 into a physical address using the TLB 35a. For example, the address converting unit 35 searches for the physical address associated with the virtual address acquired from the computing unit 31, from the TLB 35a and, when obtaining the physical address as a result of searching, outputs the obtained physical address to the cache directory managing unit 36. In addition, the address converting unit 35 executes trap processing when a TLB miss occurs. Meanwhile, system software such as the OS registers in the TLB 35a a set of a physical address and a virtual address in which a TLB miss occurs. Meanwhile, as to a physical address in a set registration of which is banned, even when the TLB miss occurs, system software such as the OS does not register a set of a physical address and a virtual address in the TLB 35a.

Meanwhile, the OS and the address converting unit 35 execute the following processing when the application executed by the computing unit 31 requests an allocation to the shared memory. That is, when the TLB miss occurs, the system software such as the OS registers an entry in the TLB 35a. Further, when the TLB miss does not occur, the entry is already registered in the TLB 35a, and the address converting unit 35 converts a virtual address into a physical address.

Further, the address converting unit 35 and the OS execute the following processing when an application or the OS request an allocation of a local area. That is, when a TLB miss occurs, system software such as the OS registers in the TLB 35a an entry which associates a virtual address which allows an application or the OS to access a local area dedicated to the CPU 21 and a range of a physical address which is allocated to the local area.

The cache directory managing unit 36 manages cache data and a directory. The cache directory managing unit 36 acquires the physical address outputted from the address converting unit 35.

Further, the cache directory managing unit 36 executes the following processing when acquiring the physical address from the address converting unit 35. That is, the cache directory managing unit 36 decides whether or not data stored in the acquired physical address is cached in the L1 cache 32 and the L2 cache 33 using the directory 36a.

Further, when deciding that the data stored in the acquired physical address is cached, the cache directory managing unit 36 outputs the cached data to the computing unit 31. Furthermore, the cache directory managing unit 36 executes the following processing when the data stored in the acquired physical address is not cached in the L1 cache 32 and the L2 cache 33. First, the cache directory managing unit 36 refers to the node map 34, and identifies a range of an entry including the acquired physical address. Further, the cache directory managing unit 36 decides whether or not a CPUID of the identified entry is the CPUID of the CPU 21. Subsequently, the cache directory managing unit 36 outputs the physical address to the memory accessing unit 41 when the CPUID of the identified entry is the CPUID of the CPU 21.

Further, the cache directory managing unit 36 executes the following processing when the CPUID of the identified entry is not the CPUID of the CPU 21. That is, the cache directory managing unit 36 acquires the CPUID of the identified entry and the physical address. Further, the cache directory managing unit 36 outputs the acquired CPUID and the physical address to the packet control unit 37.

Furthermore, when acquiring the data stored in the memory area indicated by the outputted physical address from the memory accessing unit 41 or the packet control unit 37, the cache directory managing unit 36 stores the acquired data in the L1 cache 32 and the L2 cache 33. Still further, the cache directory managing unit 36 outputs the data cached in the L1 cache 32 to the computing unit 31.

Moreover, the cache directory managing unit 36 executes the following processing when acquiring the physical address from the packet control unit 37, that is, when acquiring a request target physical address of a memory access from another CPU or an I/O device. That is, the cache directory managing unit 36 refers to the node map 34, and decides whether or not the acquired physical address is a physical address sorted to a local area.

When another partition is a request source and the acquired physical address is a physical address sorted to the local area, the cache directory managing unit 36 instructs the packet control unit 37 to transmit a denial response (access error) to the request source.

Further, when the acquired physical address is a physical address sorted to the shared area, the cache directory managing unit 36 acquires the data stored in the memory area indicated by the acquired physical address, outputs the acquired data to the packet control unit 37 and instructs the packet control unit 37 to transmit the acquired data to the request source.

Furthermore, the cache directory managing unit 36 executes processing of keeping coherency of the cached data using the directory system. When, for example, transmitting a request for data stored in the memory 22 to the CPU of the request transmission source, the cache directory managing unit 36 decides whether or not a CPU other than the CPU of the transmission source caches this data.

Further, when another CPU does not cache the request target data, the cache directory managing unit 36 acquires the request target data from the L1 cache 32, the L2 cache 33 and the memory 22. Then, the cache directory managing unit 36 outputs the acquired data to the packet control unit 37.

Meanwhile, when another CPU caches the request target data, the cache directory managing unit 36 executes processing for maintaining cache coherence using a method such as Illinois protocol. For example, the cache directory managing unit 36 decides which one of MESI (Modified/Exclusive/Shared/Invalid) a state of the cached data is.

Further, the cache directory managing unit 36 transmits and receives a request or an order (instruction) for keeping coherency to and from the cache directory managing unit of another CPU according to a decision result, and executes processing matching the state of the cached data. Meanwhile, "Modified" indicates a state where one of CPUs caches data and the cached data is updated. In addition, when the state of the cached data is "Modified", write back needs to be executed.

Further, "Exclusive" indicates a state where one of CPUs caches data and the cached data is not updated. Furthermore, "Shared" indicates a state where a plurality of CPUs cache data and the cached data is not updated. Still further, "Invalid" indicates that a cache status is not registered.

A specific example will be described. The cache directory managing unit 36 instructs the packet generating unit 37a to transmit an order of instructing a CPU which caches data with a status M (Modified) to write back. Further, the cache directory managing unit 36 updates a data status, and executes processing matching the updated status. In addition, a type of a request or an order transmitted and received by the cache directory managing unit 36 will be described below.

When acquiring the physical address and the CPUID from the cache directory managing unit 36, the packet generating unit 37a generates a packet which stores the acquired physical address and CPUID, that is, a packet which serves as a memory access request. Further, the packet generating unit 37a transmits the generated packet to the router 40.

FIG. 6 is a view for explaining a packet transmitted from a CPU according to the embodiment. With an example illustrated in FIG. 6, the packet generating unit 37a generates a request including a CPUID, a physical address and data indicating request content, and outputs the generated request to the router 40. In this case, the router 40 outputs the request generated by the packet generating unit 37a to the XB 2 through the XB connecting unit 27. Then, the XB 2 transfers the request to a CPU indicated by the CPUID included in the request.

In addition, when receiving an instruction of issuing a request or an order for keeping coherency from the cache directory managing unit 36, the packet generating unit 37a generates the instructed request or order. Further, the packet generating unit 37a transmits the generated request or order to the specified CPU through the router 40, the XB connecting unit 27 and the XB 2. Furthermore, when acquiring data from the I/O device, the packet generating unit 37a outputs to the router 40 an access request for the I/O device.

When receiving the packet outputted from another CPU or another I/O device other than a local node, the packet receiving unit 37b acquires a physical address included in the received packet. Further, when receiving the packet outputted from the I/O device of the local node through the PCIe control unit 42 and the router 40, the packet receiving unit 37b acquires the physical address included in the received packet. Furthermore, the packet receiving unit 37b outputs the acquired physical address to the cache directory managing unit 36. Still further, when receiving the data transmitted from another CPU, the packet receiving unit 37b outputs the received data to the cache directory managing unit 36.

Still further, when receiving a request or an order for keeping coherency, the packet receiving unit 37b outputs the received request or order to the cache directory managing unit 36. Moreover, when receiving a response to the access request for the I/O device or data from the router 40, the packet receiving unit 37b outputs the received response or data to the cache directory managing unit 36. In this case, for example, the cache directory managing unit 36 outputs the acquired data to the memory accessing unit 41. By this means, the memory accessing unit 41 stores data in the memory 22.

When receiving the packet outputted from the packet generating unit 37a, the router 40 outputs the received request to the XB connecting unit 27. Further, the router 40 receives the packet and the data transmitted from another CPU through the XB connecting unit 27, and outputs the received packet and data to the packet receiving unit 37b. Furthermore, the router 40 outputs to the PCIe control unit 42 the packet outputted from the packet control unit 37 to, for example, the I/O device. Still further, when receiving from the PCIe control unit 42, for example, a request from the I/O device, the router 40 outputs, for example, the received request to the packet control unit 37 or the XB connecting unit 27. Moreover, when receiving a response to the I/O device through the XB connecting unit 27 or the packet control unit 37, the router 40 outputs the received response to the PCIe bus control unit 42b.

The memory accessing unit 41 is a so-called MAC (Memory Access Controller), and controls an access to the memory 22. For example, when receiving a physical address from the cache directory managing unit 36, the memory accessing unit 41 acquires data stored in the area of the memory 22 indicated by the received physical address, and outputs the acquired data to the cache directory managing unit 36. In addition, the memory accessing unit 41 makes the shared memory redundant using a memory mirror function.

Further, the memory accessing unit 41 has an ECC checking unit 41a, a CE address register 41b and an ICE occurrence count counter 41c.

The ECC checking unit 41a performs the following processing per predetermined cycle or every time the cache directory managing unit 36 makes a read access request to the memory 22. That is, the ECC checking unit 41a decides whether or not a CE occurs in data of all memory areas of the memory 22 or data of an access target memory area. Based on this decision, the ECC checking unit 41a detects the CE. When detecting the CE, the ECC checking unit 41a reads data in a memory area in which the detected CE occurs, corrects an error of the read data and writes back the error corrected data to the memory area in which the detected CE occurs. Further, the ECC checking unit 41a reads again the data in the memory area to which the data is written back, and decides again whether or not a CE occurs in the read data. When it is decided that the CE occurs upon the second decision, the ECC checking unit 41a decides that a PCE occurs. In this way, the ECC checking unit 41a detects the PCE.

Further, the ECC checking unit 41a records a CE occurrence count within a predetermined time in the ICE occurrence count counter 41c, and decides that an ICE occurs when the CE occurs over a predetermined number of times α within the predetermined time. In this way, the ECC checking unit 41a detects the ICE. In addition, a processing unit (such as a microcomputer) in the memory accessing unit 41 may perform, for example, a counting operation of counting a CE occurrence count within a predetermined time according to program processing.

Further, when detecting the ICE or the PCE, the ECC checking unit 41a sets to the CE address register 41b the physical address of the memory 22 in which the detected ICE or PCE occurs.

When acquiring an access request to the I/O device through the router 40, the request generating unit 42a generates a request transmitted to the I/O device which is an access request target, and outputs the generated request to the PCIe bus control unit 42b. Further, when acquiring the physical address and the CPUID from the I/O device, the request generating unit 42a generates a packet which stores the acquired physical address and the CPUID, that is, a packet which serves as a memory access request. The type of such a request includes a request that the I/O device reads a memory connected with the CPU 21 or another CPU. Further, when acquiring the physical address, the CPUID and write data from the I/O device, the request generating unit 42a generates a packet which stores the acquired physical address, CPUID and write data, that is, a packet which serves as a memory access request. The type of such a request includes a request that the I/O device writes data in the memory connected to the CPU 21 or another CPU. Further, the request generating unit 42a transmits the generated packet to the router 40.

When the request generating unit 42a acquires the generated request, the PCIe bus control unit 42b transmits the request to the I/O device through the PCIe connecting unit 28. Further, when acquiring the physical address and the CPUID from the I/O device through the PCIe connecting unit 28, the PCIe bus control unit 42b transmits the acquired physical address and CPUID to the request generating unit 42a. Furthermore, when acquiring the physical address, the CPUID and the write data from the I/O device through the PCIe connecting unit 28, the CPIe bus control unit 42b transmits the acquired physical address, the CPUID and the write data to the request generating unit 42a.

Figure 7:
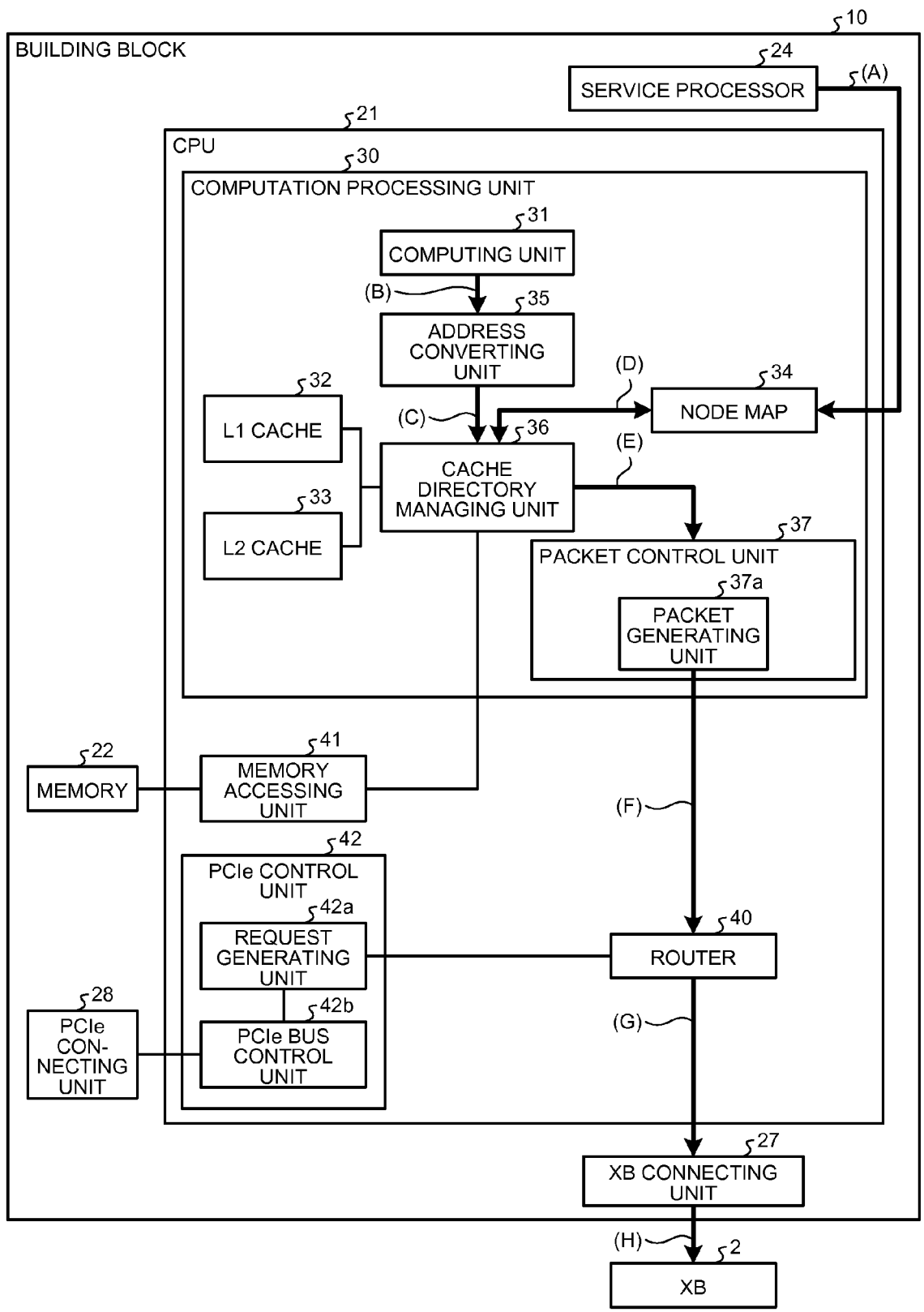
FIG. 7 is a view for explaining an example of processing of transmitting a request from the CPU according to the embodiment.

Next, an example of processing of transmitting a request from the CPU 21 to another CPU will be described using FIG. 7. FIG. 7 is a view for explaining an example of processing of transmitting a request from the CPU according to the embodiment. As indicated by, for example, (A) in FIG. 7, an entry which associates a CPUID of a CPU which accesses a memory to which a physical address is stored and the physical address of the memory is set to the node map 34 by the service processor 24.

Further, the computing unit 31 executes computation processing, and outputs an access target virtual address to the address converting unit 35 as indicated by (B) in FIG. 7. Then, the address converting unit 35 converts the virtual address into a physical address, and outputs the converted physical address to the cache directory managing unit 36 as indicated by (C) in FIG. 7.

Meanwhile, when acquiring the physical address from the address converting unit 35, as indicated by (D) in FIG. 7, the cache directory managing unit 36 refers to the node map 34, and acquires the CPUID associated with the acquired physical address. Further, when the acquired CPUID is not the CPUID of the CPU 21, as indicated by (E) in FIG. 7, the cache directory managing unit 36 outputs the acquired CPUID and physical address to the packet control unit 37.

In this case, the packet generating unit 37a generates a packet which stores the physical address and the CPUID acquired from the cache directory managing unit 36, and outputs the generated packet to the router 40 as indicated by (F) in FIG. 7. Next, as indicated by (G) in FIG. 7, the router 40 outputs to the XB connecting unit 27 the packet acquired from the packet generating unit 37a. Subsequently, as indicated by (H) in FIG. 7, the XB connecting unit 27 outputs the acquired packet to the XB 2. Then, the XB 2 sends the packet to the CPU indicated by the CPUID stored in the packet.

Figure 8:
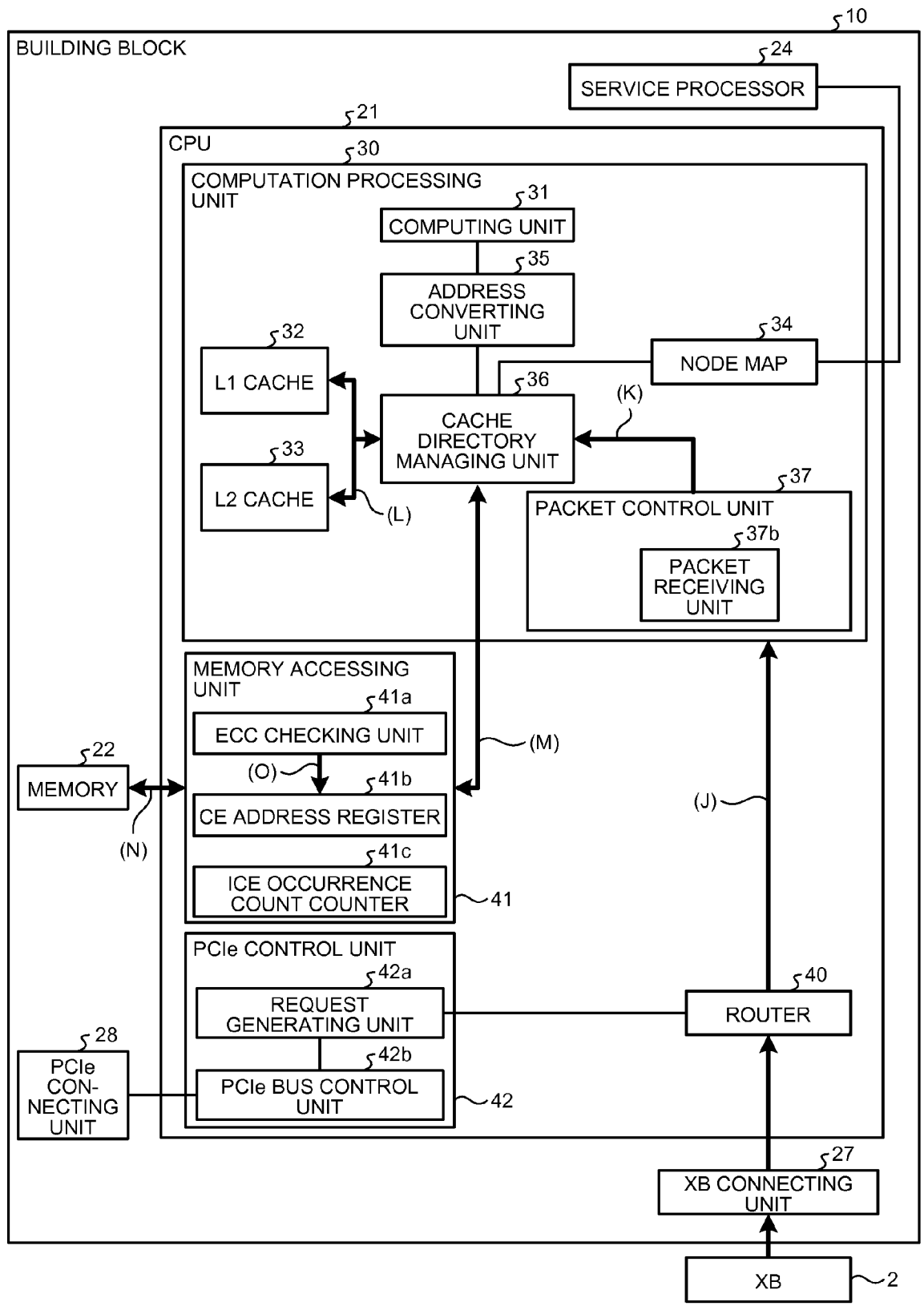
FIG. 8 is a view for explaining an example of processing executed when the CPU receives a packet according to the embodiment.

Next, an example of processing executed when the CPU 21 receives a packet from another CPU will be described using FIG. 8. FIG. 8 is a view for explaining an example of processing executed when the CPU receives a packet according to the embodiment. For example, as indicated by (J) in FIG. 8, the packet receiving unit 37b receives from another CPU the packet which stores the CPUID of the CPU 21 and the physical address sorted to the memory 22, or a response packet.

In this case, the packet receiving unit 37b acquires the physical address from the received packet and, as indicated by (K) in FIG. 8, outputs the acquired physical address to the cache directory managing unit 36 together with information showing whether or not a request source of the acquired physical address is a local partition. Then, the cache directory managing unit 36 decides whether the memory area indicated by the physical address is a shared area or a local area.

When the request source is another partition, the cache directory managing unit 36 checks whether the shared area is accessed, and requests the packet control unit 37 to respond to an error in case of the local area. In other cases, as indicated by (L) in FIG. 8, the cache directory managing unit 36 decides whether data in the memory area indicated by the physical area is cached in the L1 cache 32 and the L2 cache 33.

Further, when deciding that the data is not cached, the cache directory managing unit 36 outputs the physical address to the memory accessing unit 41 as indicated by (M) in FIG. 8. Then, as indicated by (N) in FIG. 8, the memory accessing unit 41 acquires from the memory 22 the data in the memory area indicated by the physical address, and outputs the data to the cache directory managing unit 36. Further, when the physical address is inputted to the memory accessing unit 41, if an IEC and a PEC are detected in data stored in the memory area indicated by the inputted physical address, the ECC checking unit 41a sets the physical address inputted to the CE address register 41b as indicated by (O) in FIG. 8.

Furthermore, when acquiring the data from the L1 cache 32, the L2 cache 33 or the memory accessing unit 41, the cache directory managing unit 36 outputs the acquired data to the packet control unit 37 and instructs the packet control unit 37 to transmit the data to the CPU of the request source.

Figure 9:
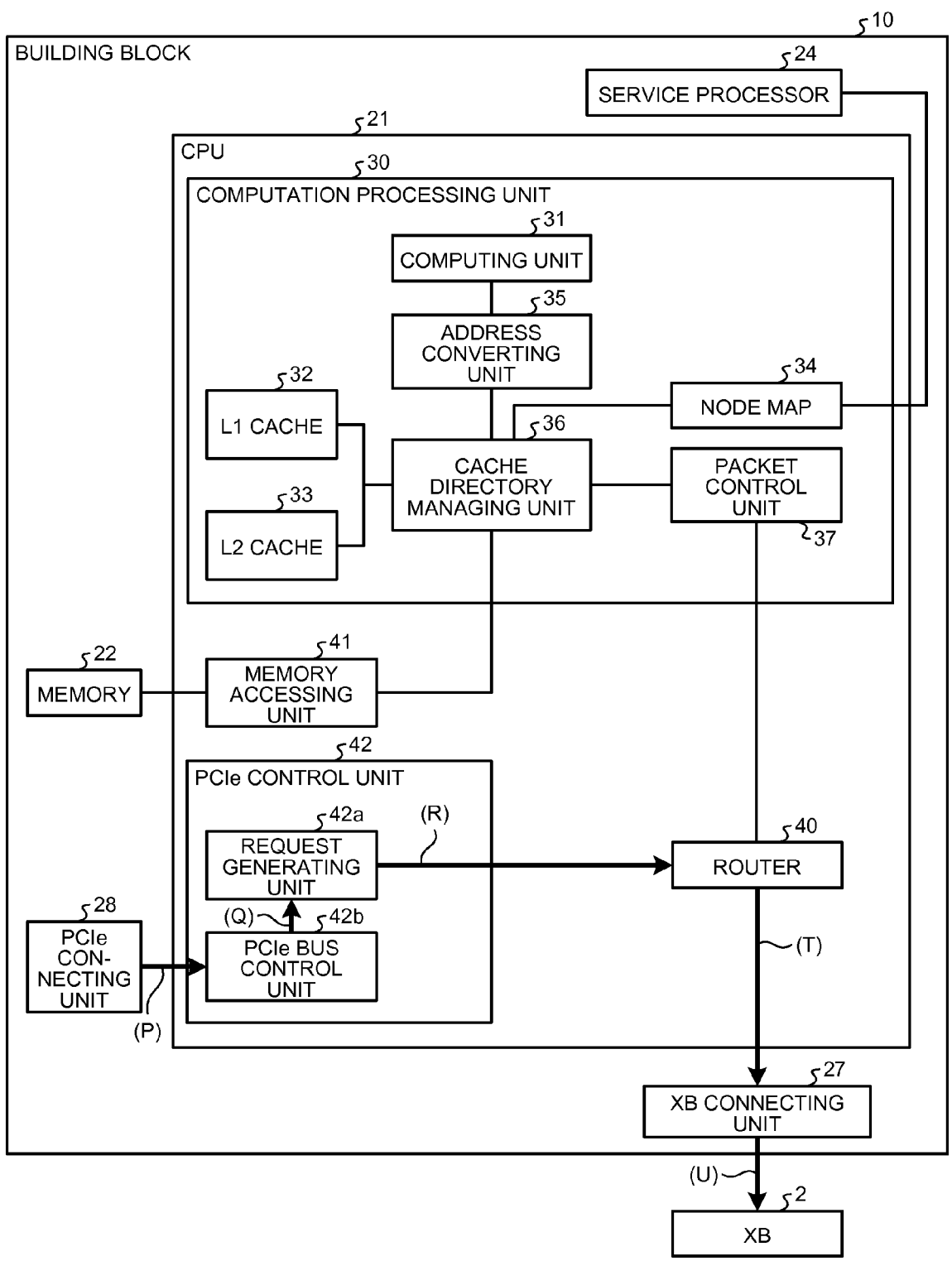
FIG. 9 is a view for explaining an example of processing of transmitting a request from an I/O device according to the embodiment.

Next, an example of processing of transmitting a read or write request from the I/O device to a CPU other than the CPU 21 will be described using FIG. 9. FIG. 9 is a view for explaining an example of processing of transmitting a request from the I/O device according to the embodiment. When, for example, acquiring the physical address and the CPUID from the I/O device, the PCIe connecting unit 28 outputs the acquired physical address and CPUID to the PCIe bus control unit 42b as indicated by (P) in FIG. 9. Further, when acquiring the physical address, the CPUID and the write data from the I/O device, the PCIe connecting unit 28 outputs the acquired physical address, CPUID and write data to the PCIe bus control unit 42b as indicated by (P) in FIG. 9.

Furthermore, when acquiring the physical address and the CPUID from the PCIe connecting unit 28, the PCIe bus control unit 42b outputs the acquired physical address and CPUID to the request generating unit 42a as indicated by (Q) in FIG. 9. Still further, when acquiring the physical address, the CPUID and the write data from the PCIe connecting unit 28, as indicated by (Q) in FIG. 9, the PCIe bus control unit 42b transmits the acquired physical address, CPUID and write data to the request generating unit 42a.

When acquiring the physical address and the CPUID from the PCIe bus control unit 42b, the request generating unit 42a generates a packet which serves as a read request including the acquired physical address and CPUID. Further, when acquiring the physical address, the CPUID and the write data from the PCIe bus control unit 42b, the request generating unit 42a generates a packet which serves as a write request including the acquired physical address, CPUID and write data. Furthermore, as indicated by (R) in FIG. 9, the request generating unit 42a outputs the generated packet to the router 40.

Next, as indicated by (T) in FIG. 9, the router 40 outputs to the XB connecting unit 27 the request acquired from the request generating unit 42a. Subsequently, as indicated by (U) in FIG. 9, the XB connecting unit 27 outputs the acquired request to the XB 2. Then, the XB 2 sends the packet to the CPU indicated by the CPUID stored in the request.

Figure 10:
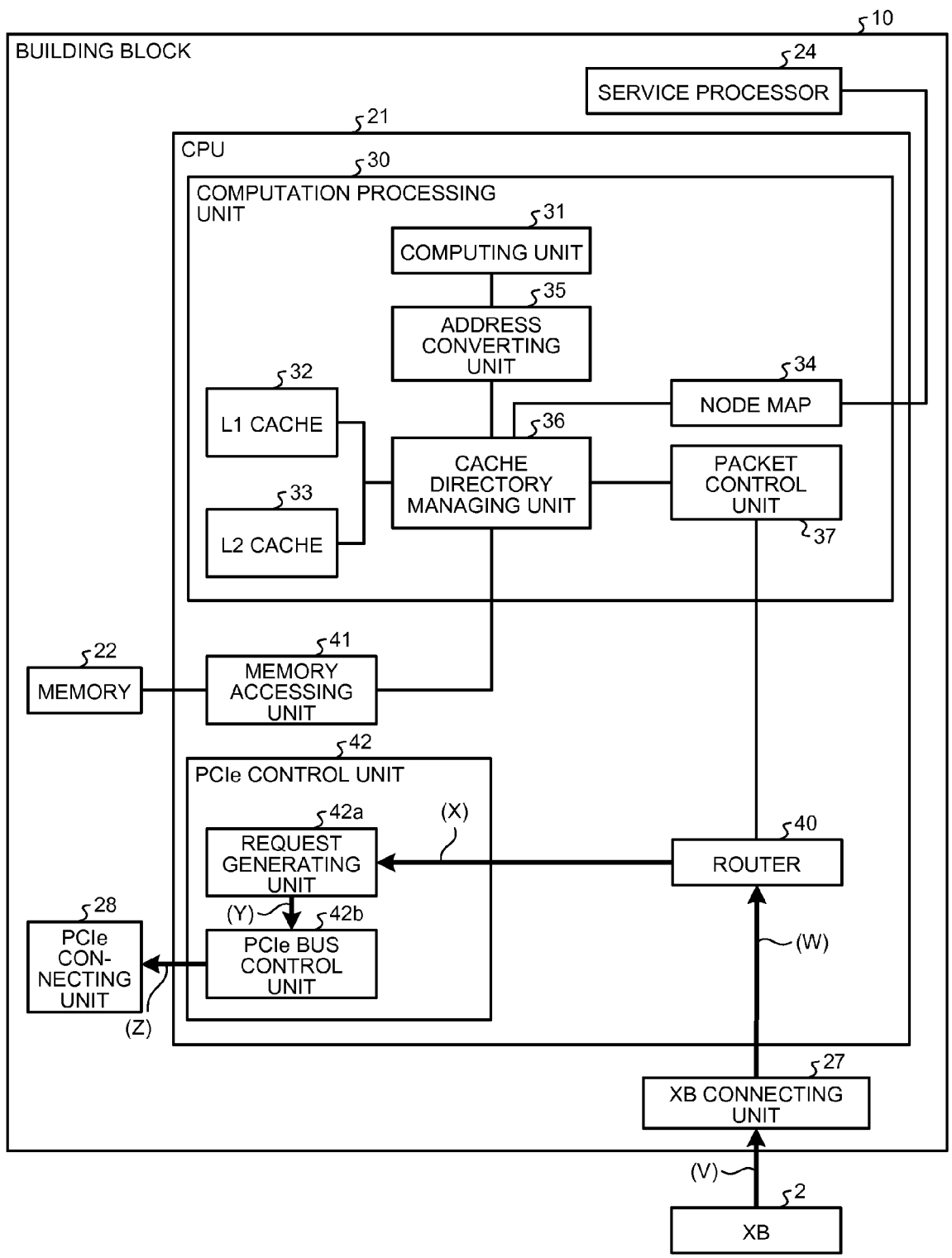
FIG. 10 is a view for explaining an example of processing of receiving a response at the I/O device according to the embodiment.

Next, an example of processing of receiving a response at the I/O device from a CPU other than the CPU 21 will be described using FIG. 10. FIG. 10 is a view for explaining an example of processing of receiving a response at the I/O device according to the embodiment. For example, as indicated by (V) in FIG. 10, the XB connecting unit 27 receives a response to the I/O device from a CPU other than the CPU 21.

When receiving the response, as indicated by (W) in FIG. 10, the XB connecting unit 27 outputs the received response to the router 40. When receiving the response, as indicated by (X) in FIG. 10, the router 40 outputs the received response to the request generating unit 42a. Further, as indicated by (Y) in FIG. 10, the request generating unit 42a outputs the response to the PCIe bus control unit 42b. When receiving the response, as indicated by (Z) in FIG. 10, the PCIe bus control unit 42b outputs the received response to the PCIe connecting unit 28. By this means, the response is transmitted from the PCIe connecting unit 28 to the I/O device.

The communication unit 23, the service processor 24, the XB connecting unit 27, the XB connecting unit 27a and the PCIe connecting unit 28 are electronic circuits. Meanwhile, as an example of electronic circuits, integrated circuits such as ASIC (Application Specific Integrated Circuit) and FPGA (Field Programmable Gate Array), CPUs or MPUs (Micro Processing Unit) are applicable. Further, instead of the CPUs 21 to 21c, integrated circuits such as ASIC and FPGA, or MPUs are applicable.

Furthermore, the memories 22 to 22a are semiconductor memory elements such as RAM (Random Access Memory), ROM (Read Only Memory) or flash memory. Still further, the L1 cache 32 and the L2 cache 33 are high speed semiconductor memory elements such as SRAM (Static Random Access Memory).

Next, processing of keeping cache coherence in each of the CPUs 21 to 21c will be described. In addition, in the following description, each CPU of the information processing system 1 keeps coherence using the Illinois protocol.

Further, in the following description, each memory of the information processing system 1 is identified as a memory which has space which all CPUs can cache data. Furthermore, in the following description, a CPU which is directly and physically connected to a memory which stores requested data through a MAC in the CPU is referred to as a "home CPU", and a CPU which requests a data to store it on its cache is referred to as a "local CPU".

Still further, a CPU which has already transmitted a request to the home CPU and has already cached data is referred to as a "remote CPU". In addition, the local CPU and the home CPU are the same in some cases, and the local CPU and the remote CPU are the same in some cases.

The local CPU decides that an access target physical address is sorted to a memory which accesses the home CPU, referring to a node map of the local CPU. Further, the local CPU issues to the home CPU a request which stores the physical address. In addition, the request issued by the local CPU includes a plurality of types of requests. Hence, a cache directory managing unit of the home CPU controls cache coherence according to the type of the acquired request.

The types of requests issued by the local CPU include, for example, shared fetch access, exclusive fetch access, cache invalidation request and cache replace request. The shared fetch access is, for example, an execution request of "MoveIn to Share", and is a request issued when the home CPU reads data from a memory to access.

Further, the exclusive fetch access is, for example, an execution request of "MoveIn Exclusively", and is issued upon loading of data to a cache when the home CPU stores data in a memory to access. Furthermore, the cache invalidation request is, for example, an execution request of "MoveOut", and is issued when the home CPU is requested to invalidate a cache line. In addition, when receiving the cache invalidation request, the home CPU issues the cache invalidation request to a remote CPU in some cases and issues an order of performing "Invalidation" of the cache in some cases.

The cache replace request is, for example, an execution request of "WriteBack", and is issued when the home CPU writes updated cache data, that is, cache data in a "Modified" state, to a memory to access. In addition, the cache replace request is, for example, an execution request of "FlushBack", and is issued when cache data which is not updated, that is, a cache in a "Shared" or "Exclusive" state is discarded.

When receiving the above request from the local CPU or the remote CPU, the home CPU issues an order to the local CPU or the remote CPU to process the request. Meanwhile, the home CPU issues a plurality of types of orders to control cache coherence according to the type of the acquired request. For example, the home CPU issues "MoveOut and Bypass to Share" to load data cached by the remote CPU to the local CPU.

Further, for example, the home CPU invalidates a cache of all remote CPUs other than the local CPU, and then the home CPU issues "MoveOut and Bypass Exclusively" to transmit data to the local CPU. Furthermore, the home CPU issues "MoveOut WITH Invalidation" for requesting a remote CPU to invalidate a cache. In addition, when the home CPU issues "MoveOut WITH Invalidation", all CPU caches enter an "Invalidate" state for a target address. In addition, the local CPU caches data when transaction is completed.

Further, the home CPU issues "MoveOut for Flush" for requesting a remote CPU to invalidate a cache line. In addition, when the home CPU issues "MoveOut for Flush", target data is stored only in the memory of the home CPU. Further, when a target data state is "Shared", the home CPU issues "Buffer Invalidation" for requesting the remote CPU to discard the cache.

The home CPU issues the above order according to the type of the request, and transitions a state of data cached by each CPU. Further, when receiving the order, the local CPU and the remote CPU executes processing indicated by the order, and transitions the state of data cached by the local CPU and the remote CPU.

Subsequently, the local CPU and the remote CPU transmit to the home CPU a completion response to the order or a completion response with data. Further, the home CPU and the remote CPU executes the ordered processing, and then transmits a request response with data to the local CPU.

Flow of Processing

Figure 11:
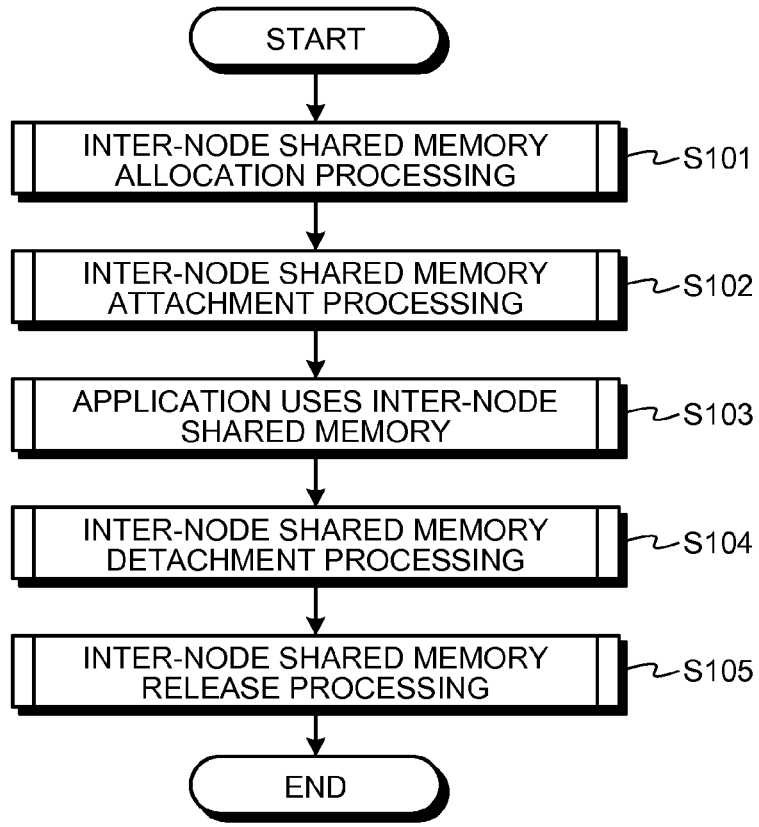
FIG. 11 is a flowchart for explaining a flow of processing of controlling a shared area.

Next, a flow of processing of the information processing system 1 of controlling the shared area will be described using FIG. 11. FIG. 11 is a flowchart for explaining a flow of processing of controlling the shared area. First, the information processing system 1 executes processing of allocating a shared memory between nodes according to a request from an application (step S101). Next, the information processing system 1 executes processing of attaching the shared memory shared between nodes (step S102).

Subsequently, an application executed by each CPU of the information processing system 1 uses each memory (step S103). Next, the information processing system 1 executes processing of detaching the shared memory (step S104). Subsequently, the information processing system 1 executes processing of releasing the shared memory (step S105), and finishes processing. In addition, only the application of the home node of this shared memory may implement step S101 and step S105, or, while actual processing is nop (no operation), an application of a node other than the home node of this shared memory may also implement step S101 and step S105.

Figure 12:
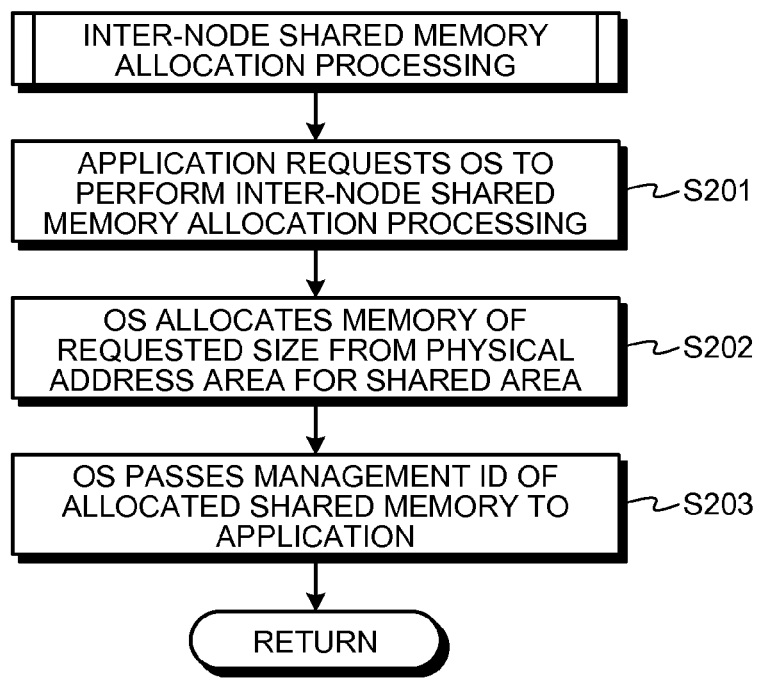
FIG. 12 is a flowchart for explaining processing of allocating the shared memory.

Next, a flow of processing of allocating the shared memory in step S101 in FIG. 11 will be described using FIG. 12. FIG. 12 is a flowchart for explaining processing of allocating the shared memory. With an example illustrated in FIG. 12, the application executed by the CPU 21 requests the OS to execute processing of allocating the shared memory between nodes (step S201).

Then, the OS executed by the CPU 21 allocates a memory of a size requested from a physical address area for the shared area (step S202). Next, a management ID of the shared memory allocated by the OS is passed to the application (step S203), and the shared memory allocation processing is finished.

Figure 13:
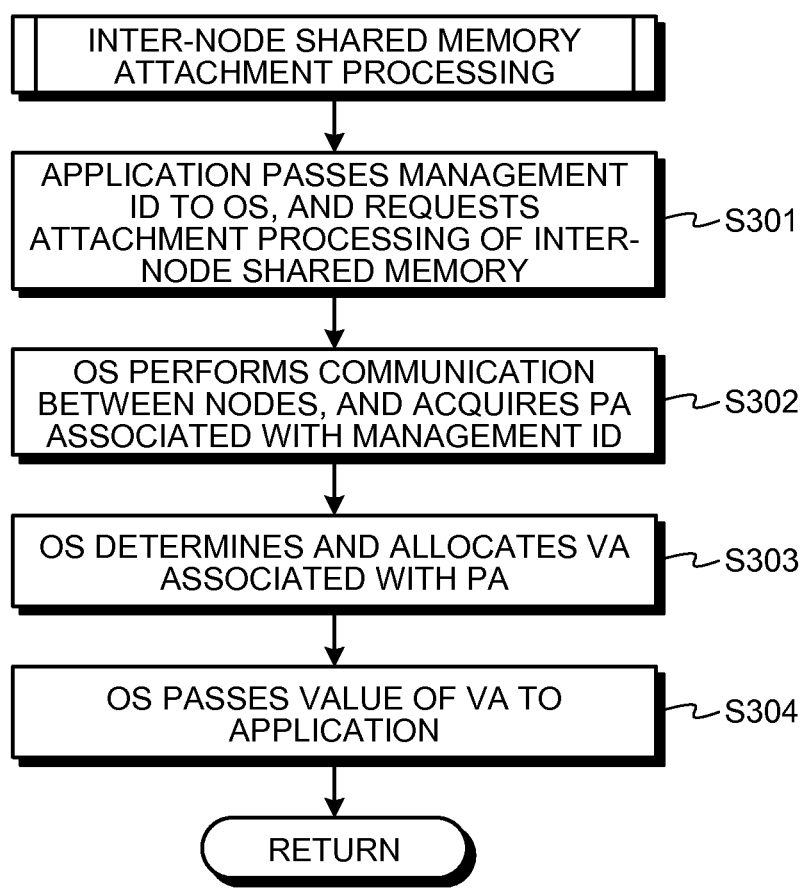
FIG. 13 is a flowchart for explaining shared memory attachment processing.

Next, a flow of processing of attaching the shared memory between nodes in step S102 in FIG. 11 will be described using FIG. 13. FIG. 13 is a flowchart for explaining shared memory attachment processing. First, the application passes the management ID to the OS, and requests processing of attaching the shared memory between nodes (step S301). In this case, the OS communicates with an OS executed by another node, and acquires a physical address associated with the management ID (step S302).

Meanwhile, when the OS communicates with the OS executed by another node, communication through the LAN or communication between nodes through the service processor 24 is used. Further, the OS executed by each node sets a specific shared memory as an area used for communication between nodes and stores or reads information about the set area to perform communication.

Next, the OS determines and allocates a virtual address associated with the physical address (step S303). For example, the OS executed by the CPU 21 sets the TLB 35a of the physical address and the virtual address to the address converting unit 35.

In addition, the virtual address used by each of the CPUs 21 to 21c may be an overlapping range, or may be a range which varies per CPU. Further, the virtual address used by each of the CPUs 21 to 21c may be specified with respect to the OS by the application. Subsequently, a value of the virtual address is passed to the application (step S304), and processing is finished.

Figure 14:
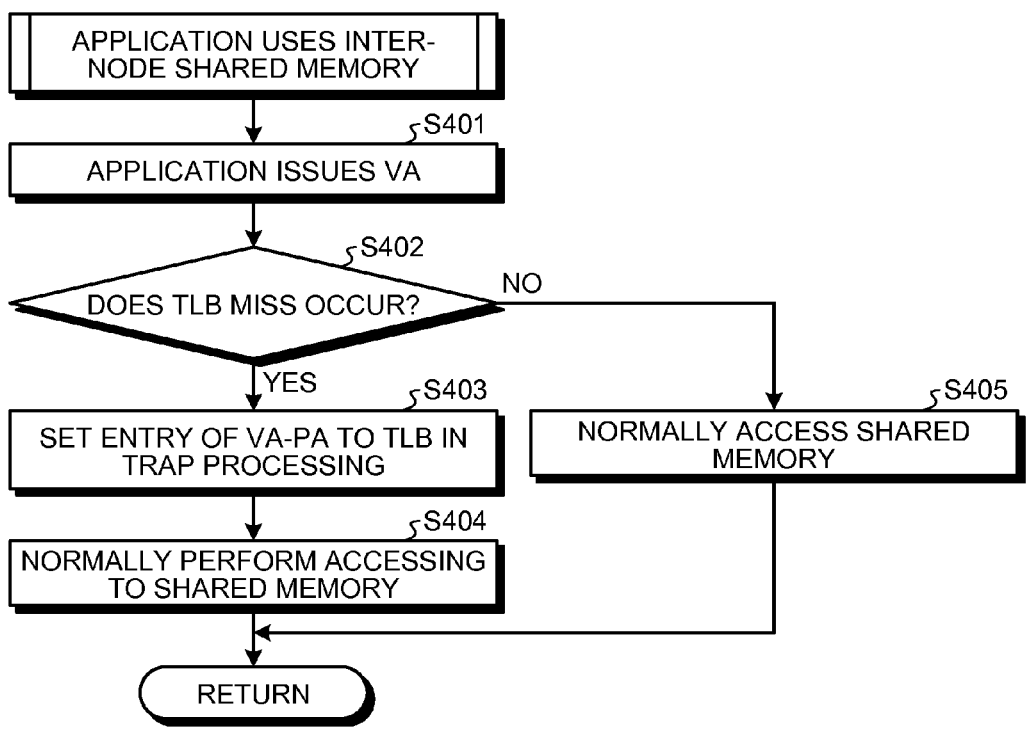
FIG. 14 is a flowchart for explaining processing of using the shared memory in an application.

Next, a flow of processing of using the shared memory between nodes in the application in step S103 in FIG. 11 will be described using FIG. 14. FIG. 14 is a flowchart for explaining processing of using the shared memory in an application. For example, the application executed by the CPU 21 issues the virtual address, and accesses the memory area indicated by the virtual address (step S401).

Then, the CPU 21 decides whether or not a TLB miss occurs (step S402). Further, when the TLB miss occurs (Yes in step S402), the CPU 21 executes trap processing, and sets to the TLB an entry which is a set of the virtual address and the physical address (step S403).

Next, the application issues a virtual address again, converts the virtual address into the physical address using the TLB and then normally accesses the shared memory (step S404), and finishes processing. Meanwhile, when the TLB miss does not occur (No in step S402), an access to the shared memory is normally executed (step S405), and processing is finished.

Figure 15:
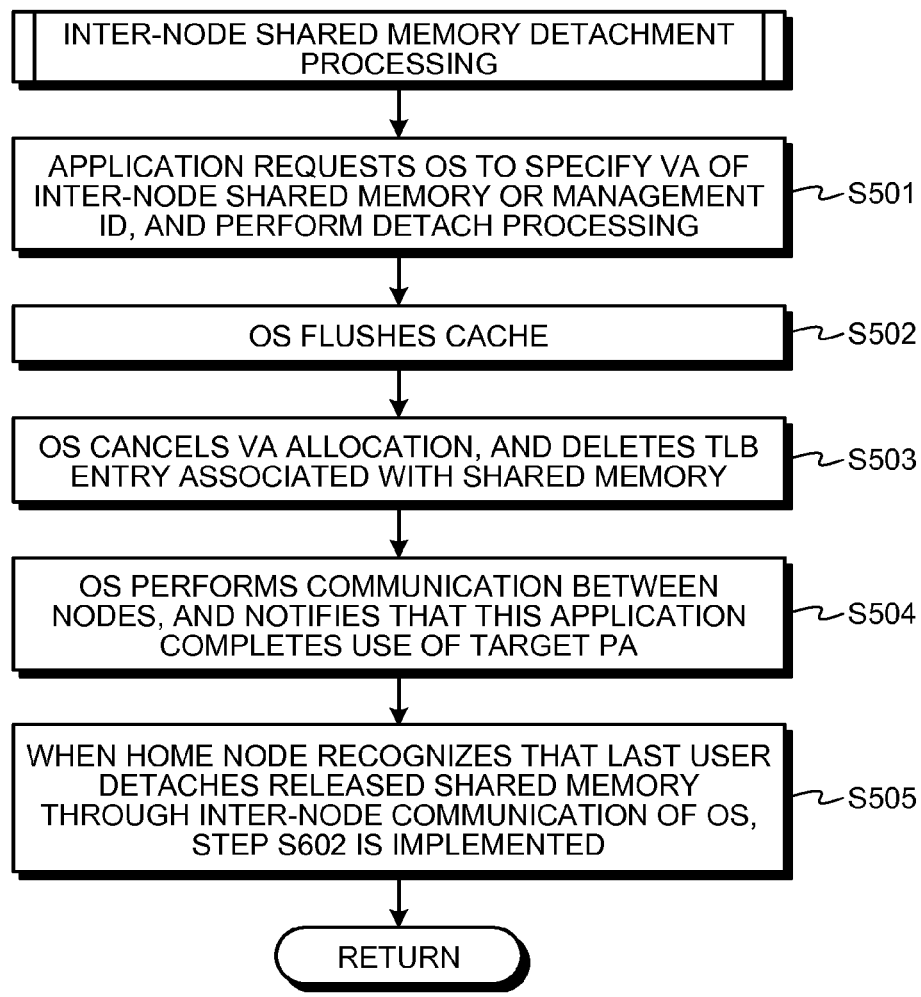
FIG. 15 is a flowchart for explaining processing of detaching the shared memory between nodes.

Next, a flow of processing of detaching the shared memory between nodes in step S104 in FIG. 11 will be described using FIG. 15. FIG. 15 is a flowchart for explaining processing of detaching the shared memory between nodes. For example, the application executed by the CPU 21 specifies the virtual address of the shared memory between the nodes or the management ID to the OS, and requests detachment processing (step S501).

Then, the OS executed by the CPU 21 flushes the cache (step S502). That is, when the OS allocates the shared memory again after allocation of the shared memory is freed (=de-allocated), if a home node of the shared memory while the shared memory is not allocated and is rebooted, there is a concern that a state of the cache and a state of the real memory conflict with. Hence, the OS flushes the cache, and prevents a state where the state of the cache and the state of the real memory conflict with.

Further, the OS cancels an allocation of the inter-node shared memory, that is, a range of the virtual address used by the application, and deletes an entry of the TLB 35a related to the canceled virtual address (step S503). In addition, subsequently, even when a TLB miss occurs in a detached memory address on this node (Yes in step S402), the OS does not set the physical address associated with the detached virtual address to the TLB 35a. Hence, step S404 is not normally finished, and an access error occurs. Unlike processing in step S302, after detachment is completed, the OS performs communication between nodes, and this application notifies that an access to a PA of this shared memory is completed (step S504). If this shared memory is released on the home node and this application is the last application which uses this shared memory, the home node is requested to perform release processing (step S505) and processing is finished.

Figure 16:
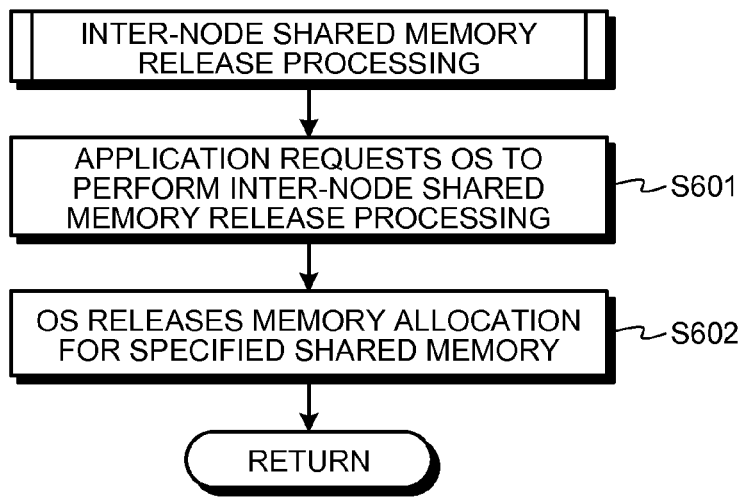
FIG. 16 is a flowchart for explaining processing of releasing an inter-node shared memory.

Next, a flow of processing of releasing an inter-node shared memory in step S105 in FIG. 11 will be described using FIG. 16. FIG. 16 is a flowchart for explaining the processing of releasing the inter-node shared memory. For example, the application executed by the CPU 21 requests the OS to perform processing of releasing the inter-node shared memory (step S601). Then, when all users detach the specified shared memory, the OS releases an allocation (step S602), and finishes processing. If detachment is not completed, the processing is completed without performing allocation release processing. In addition, processing of completing an actual allocation is performed in step S505.

Figure 17:
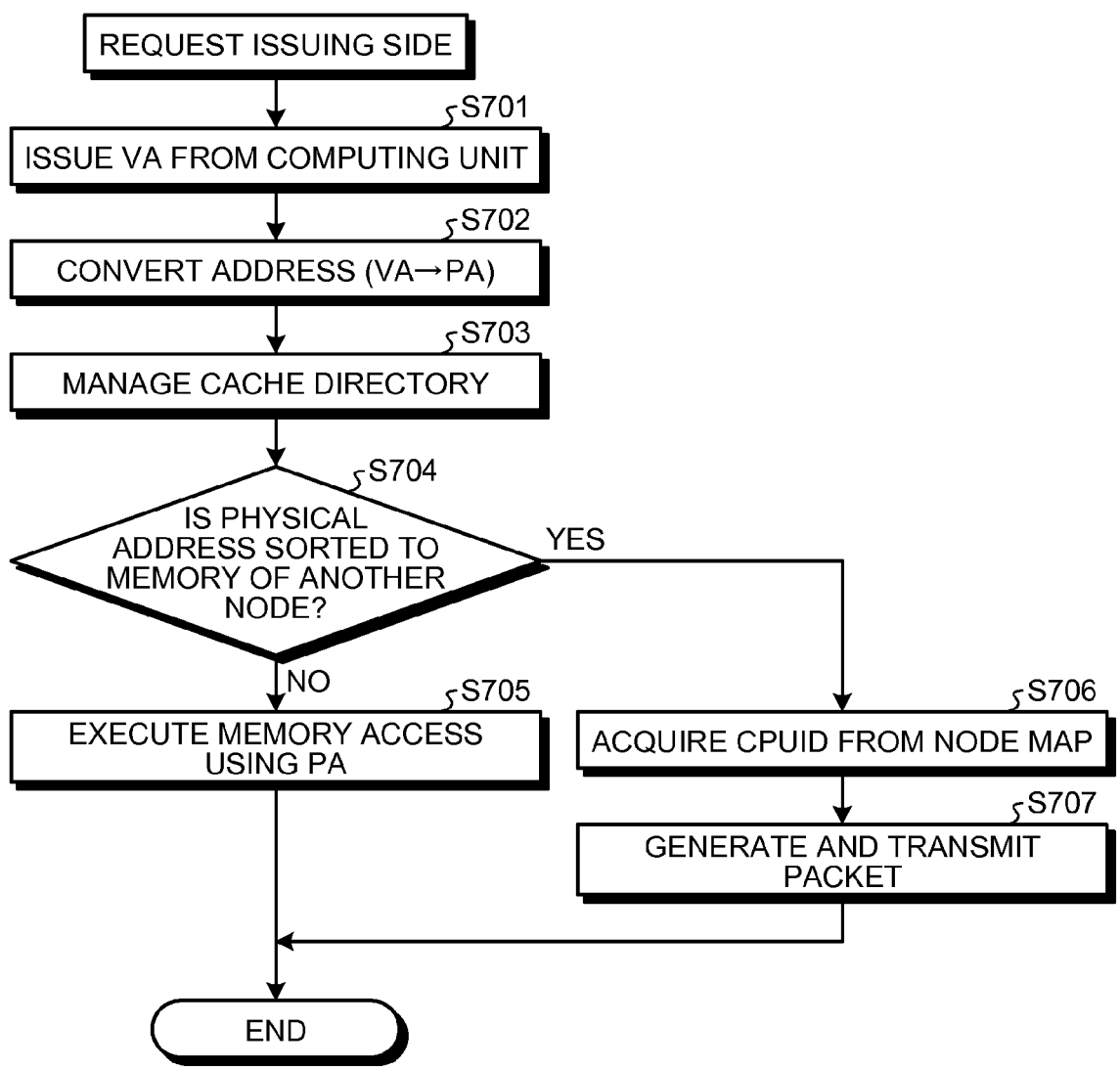
FIG. 17 is a flowchart for explaining a flow of processing of issuing a request.

Next, a flow of processing of transmitting a memory access request from the CPU 21 to another CPU will be described using FIG. 17. FIG. 17 is a flowchart for explaining a flow of processing of issuing a request. For example, the computing unit 31 of the CPU 21 issues a virtual address (step S701).

Then, the address converting unit 35 converts the virtual address into a physical address (step S702). Next, the cache directory managing unit 36 acquires the physical address, and manages the cache directory (step S703). That is, the cache directory managing unit 36 transitions a cache state of a memory area indicated by the acquired physical address.

Next, the cache directory managing unit 36 refers to the node map 34, and decides whether or not the acquired physical address is a physical address sorted to a memory of another node (another partition) (step S704). Further, when deciding that the acquired physical address is not a physical address sorted to the memory of another node (another partition) (No in step S704), the cache directory managing unit 36 executes a memory access using the acquired physical address (step S705). Furthermore, processing is finished.

Meanwhile, when the acquired physical address is a physical address sorted to the memory of another node (another partition) (Yes in step S704), the cache directory managing unit 36 acquires a CPUID associated with the physical address from the node map (step S706). Further, the packet transmitting unit generates a packet which stores the CPUID and the physical address, that is, the memory access request and sends the packet to the XB 2 (step S707), and finishes processing.

Figure 18:
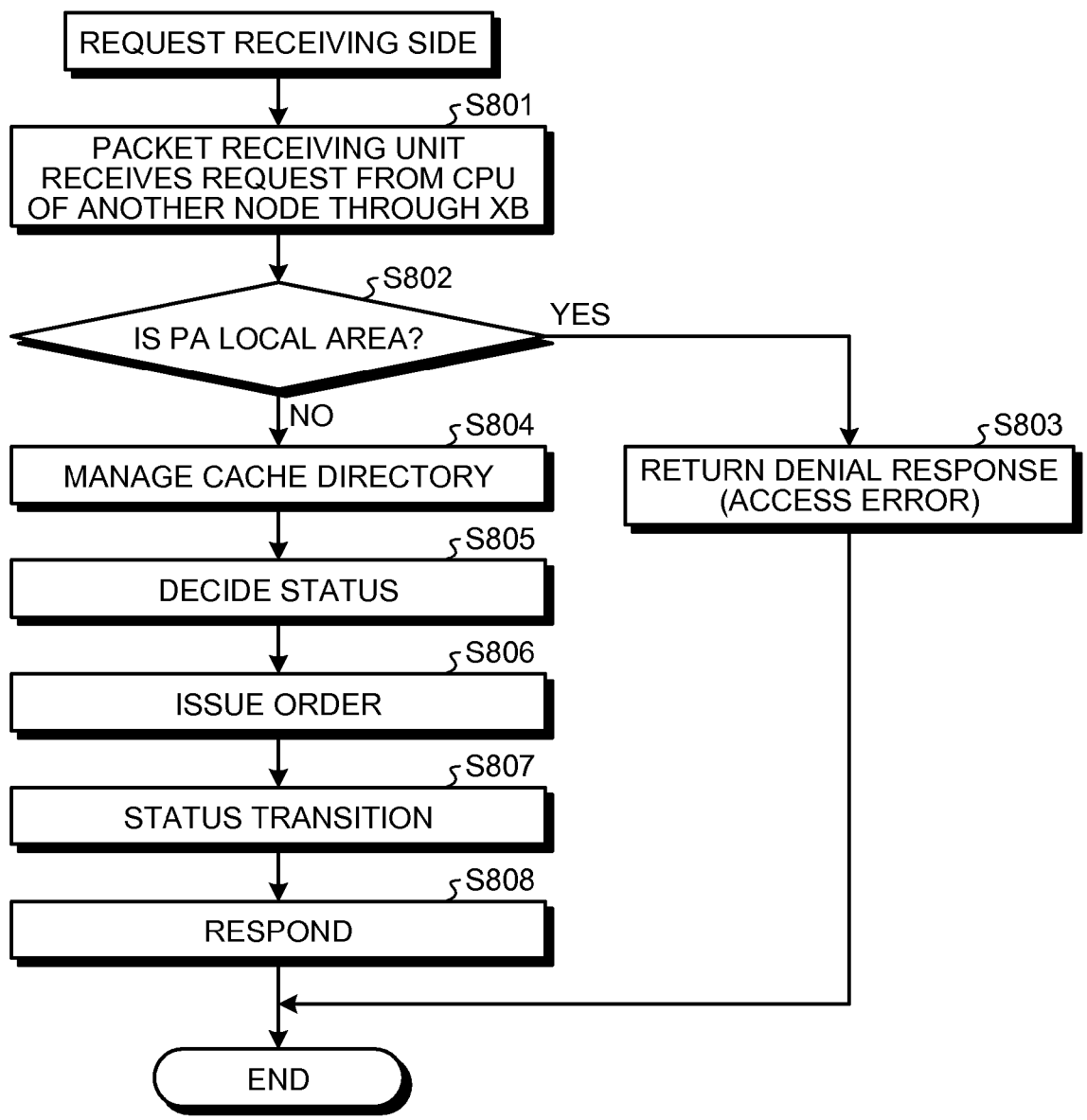
FIG. 18 is a flowchart for explaining a flow of processing executed when a request is received.

Next, a flow of processing executed when the CPU 21 receives the memory access request from another CPU will be described using FIG. 18. FIG. 18 is a flowchart for explaining a flow of processing executed when a request is received. In addition, with an example illustrated in FIG. 18, a flow of processing executed when the CPU 21 receives "MoveIn to Share" or "MoveIn Exclusively" from another CPU. For example, the CPU 21 receives a request from another CPU through the XB 2 (step S801).

In this case, the CPU 21 decides whether or not a request target physical address is a local area using the node map (step S802). Further, when the request target physical address is a local area (Yes in step S802), the CPU 21 returns a denial response to a request source CPU (step S803), and finishes processing.

Furthermore, when the request target physical address is not a local area (No in step S802), the CPU 21 manages the cache directory which keeps coherence (step S804). Still further, the CPU 21 decides a status of a memory area indicated by the physical address (step S805).

Still further, the CPU 21 issues an order matching the decided status to another CPU (step S806), and transitions the status (step S807). Subsequently, the CPU 21 makes a response for transmitting data in the memory area indicated by the physical address to the request source CPU (step S808), and finishes processing.

Figure 19:
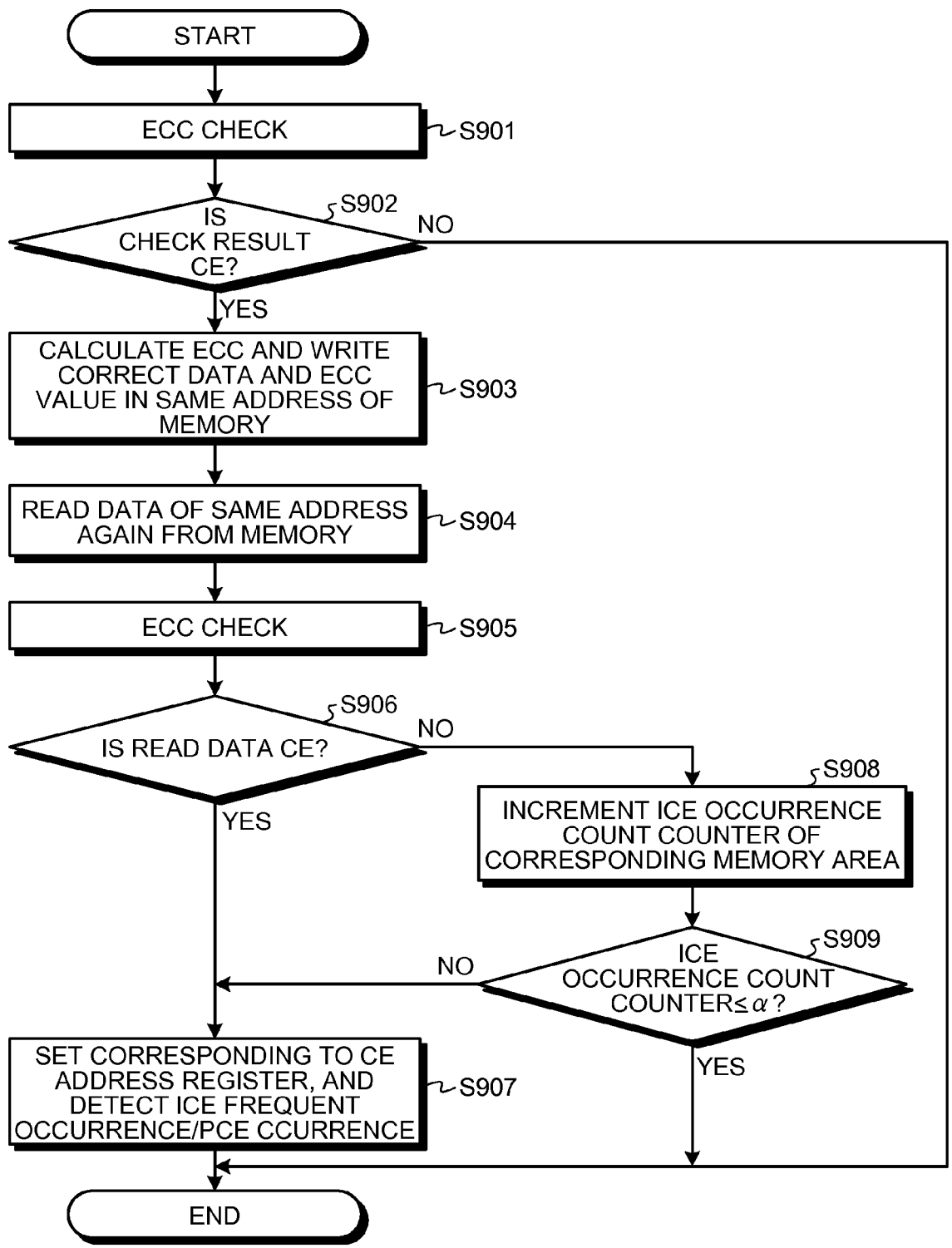
FIG. 19 is a flowchart for explaining a flow of processing executed by an ECC checking unit.

Next, a flow of processing executed by the ECC checking unit 41a per predetermined cycle or every time the cache directory managing unit 36 makes a read access request to the memory 22 will be described using FIG. 19. FIG. 19 is a flowchart for explaining a flow of processing executed by the ECC checking unit. As illustrated in FIG. 19, the ECC checking unit 41a checks an error of data in all memory areas of the memory 22 and data in an access target memory area (step S901). Further, the ECC checking unit 41a decides whether or not a CE occurs (step S902).

When the CE does not occur (No in step S902), that is, when, for example, data is normal or a PE occurs, processing is finished. In addition, in this case, the memory accessing unit 41 transmits data in the read access target memory area to the cache directory managing unit 36. Meanwhile, when the CE occurs (Yes in step S902), the ECC checking unit 41a reads data in a memory area in which the CE occurs, corrects an error of the read data, and writes the error corrected data back to the memory area in which the CE occurs (step S903). Further, the ECC checking unit 41a reads again data in the memory area to which data is written back (step S904), and checks an error again (second time) for the read data (step S905).

Subsequently, the ECC checking unit 41a decides whether or not the CE occurs in the data for which an error is checked again (step S906). When the CE occurs (Yes in step S906), the ECC checking unit 41a sets the physical address of the memory 22 in which the CE occurs, to the CE address register 41b (step S907), and finishes processing. By this means, it is possible to detect an ICE.

Meanwhile, when the CE does not occur in the second error check (No in step S906), the ECC checking unit 41a increments a value of the ICE occurrence count counter 41c corresponding to the physical address of the memory 22 in which the CE occurs (step S908). Meanwhile, the ICE occurrence count counter 41c is provided per predetermined memory area of the memory 22. When, for example, error correction of one bit can be performed per every 64 byte by the ECC, the ICE occurrence count counter 41c is provided every 64 byte. Further, the ICE occurrence count counter 41c may be provided per page obtained by dividing a memory area of the memory 22.

Furthermore, the ECC checking unit 41a decides whether or not the value of the ICE occurrence count counter 41c is a threshold a or less (step S909). When the value of the ICE occurrence count counter 41c is greater than the threshold a (No in step S909), the step proceeds to step S907. Meanwhile, when the value of the ICE occurrence count counter 41c is the threshold a or less (Yes in step S909), processing is completed.

Figure 20:
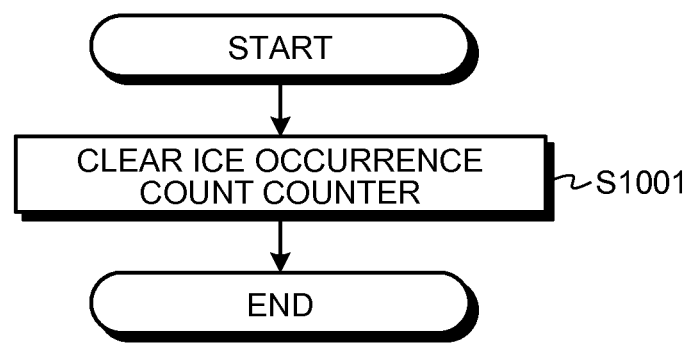
FIG. 20 is a flowchart for explaining a flow of processing executed by the ECC checking unit.

Next, a flow of processing executed by the ECC checking unit 41a per predetermined cycle will be described using FIG. 20. FIG. 20 is a flowchart for explaining a flow of processing executed by the ECC checking unit. This processing is executed in a cycle longer than the cycle in which the processing illustrated in FIG. 19 is executed. As illustrated in FIG. 20, the ECC checking unit 41a clears the value of the ICE occurrence count counter 41c (step S1001), and finished processing.

In addition, when the ECC checking unit 41a counts CEs which occur and calculates a value obtained by dividing the a count of CEs by a time spent for counting (an occurrence count of the CEs per unit time), and can decide that an ICE occurs when the calculated value exceeds a threshold $\beta$. An example of processing executed by the ECC checking unit 41a to detect that an ICE occurs in this way will be described.

FIGS. 21 to 27 are views for explaining examples of processing of detecting occurrence of an ICE executed by the ECC checking unit. FIGS. 21 to 27 illustrate examples of tables used by the ECC checking unit 41a. The tables illustrated by the examples of FIGS. 21 to 27 include an item of "average value" in which a CE occurrence count per unit time is registered, an item of "start time" in which a time at which counting of the CE occurrence count is started and an item of "final occurrence time" in which a time at which a CE occurs the last time is registered.

For example, content registered in the table illustrated in FIG. 21 indicates that counting of the CE occurrence count is started at 0:00 on Jan. 1, 2011 and the time at which a CE occurs the last time is at 3:30 on Jan. 1, 2011. Further, content registered in the table illustrated in FIG. 21 indicates that a value obtained by dividing a count of CEs which occur in 210 minutes from 0:00 to 3:30 on Jan. 1, 2011 by 210 minutes, that is, an average value of a count of CEs which occur in one minute of a unit time is 0.1 (times/minute).

A case will be explained with an example in FIG. 21 where the ECC checking unit 41a detects a new EC at 3:50 on Jan. 1, 2011. In this case, the ECC checking unit 41a calculates the count "21" (0.1×210) of CEs which occur in 210 minutes from 0:00 to 3:30 on Jan. 1, 2011 from the table illustrated by the example in FIG. 21. Further, the ECC checking unit 41a calculates the count "22" (21+1) of CEs which occur in 230 minutes from 0:00 to 3:50 on Jan. 1, 2011. Subsequently, the ECC checking unit 41a calculates a value obtained by dividing the count "22" of CEs which occur in 230 minutes from 0:00 to 3:50 on Jan. 1, 2011 by 230 minutes, that is, an average "0.095" of the count of CEs which occur in one minute of a unit time. Further, as illustrated in the example of FIG. 22, the ECC checking unit 41a updates the item of "average value" of the table and the item of "final occurrence time" to "0.095" and "2011/1/1 03:50", respectively. Subsequently, the ECC checking unit 41a decides whether or not the average value "0.095" exceeds the threshold $\beta$, detects occurrence of an ICE when the average value exceeds the threshold $\beta$ and sets the physical address of the memory 22 in which the CE has occurred, to the CE address register 41b.

In addition, as illustrated in the example in FIG. 23, "0" is registered in each item as a table default value. In addition, "0" in items of "start time" and "final occurrence time" means a specific time in a system such as 0:00 on Jan. 1, 1970 in a Unix (registered trademark) system.

Further, the ECC checking unit 41a performs the following processing when a CE occurs for the first time. A case will be described with the example in FIG. 23 where the ECC checking unit 41a detects the first EC at 0:00 on Jan. 1, 2011. In this case, as illustrated in the example in FIG. 24, the ECC checking unit 41a updates items of "average value", "start time" and "final occurrence time" in the table to "1", "2011/1/1 00:00" and "2011/1/1 00:00", respectively.

Further, the ECC checking unit 41a performs the following processing when the second CE occurs. A case will be described with the example in FIG. 24 where the ECC checking unit 41a detects the second EC at 0:05 on Jan. 1, 2011. In this case, the ECC checking unit 41a calculates a count "2" (1+1) of CEs which occur in 5 minutes from 0:00 to 0:05 on Jan. 1, 2011. Subsequently, the ECC checking unit 41a calculates a value obtained by dividing a count "2" of CEs which occur in 5 minutes from 0:00 to 0:05 to 0:05 on Jan. 1, 2011 by 5 minutes, that is, an average value "0.4" of a count of CEs which occur in one minute of a unit time. Further, as illustrated in the example of FIG. 25, the ECC checking unit 41a updates the item of "average value" and the item of "final occurrence time" of the table to "0.5" and "2011/1/1 00:05", respectively.

In addition, when detecting a CE a predetermined time such as one hour or more after a time at which the item of "final occurrence time" is registered, the ECC checking unit 41a can detect that occurrence of this CE is occurrence of the first CE. A case will be described with the example of FIG. 26 where information showing that a CE is finally detected at 3:30 on Jan. 1, 2011 is registered in the item of "final occurrence time" of the table. In this case, when detecting a CE at 5:30 on Jan. 1, 2011 after a predetermined time (one hour) or more passes from 3:30 on Jan. 1, 2011, the ECC checking unit 41a detects that this CE is detected for the first time. Further, as illustrated in FIG. 27, the ECC checking unit 41a updates the items of "average value", "start time" and "final occurrence time" of the table to "1", "2011/1/1 05:30" and "2011/1/1 05:30". By this means, when a CE occurrence frequency rapidly rises, it is possible to prevent a rise of the CE occurrence frequency from being noticed due to a low past occurrence frequency.

Figure 28A:
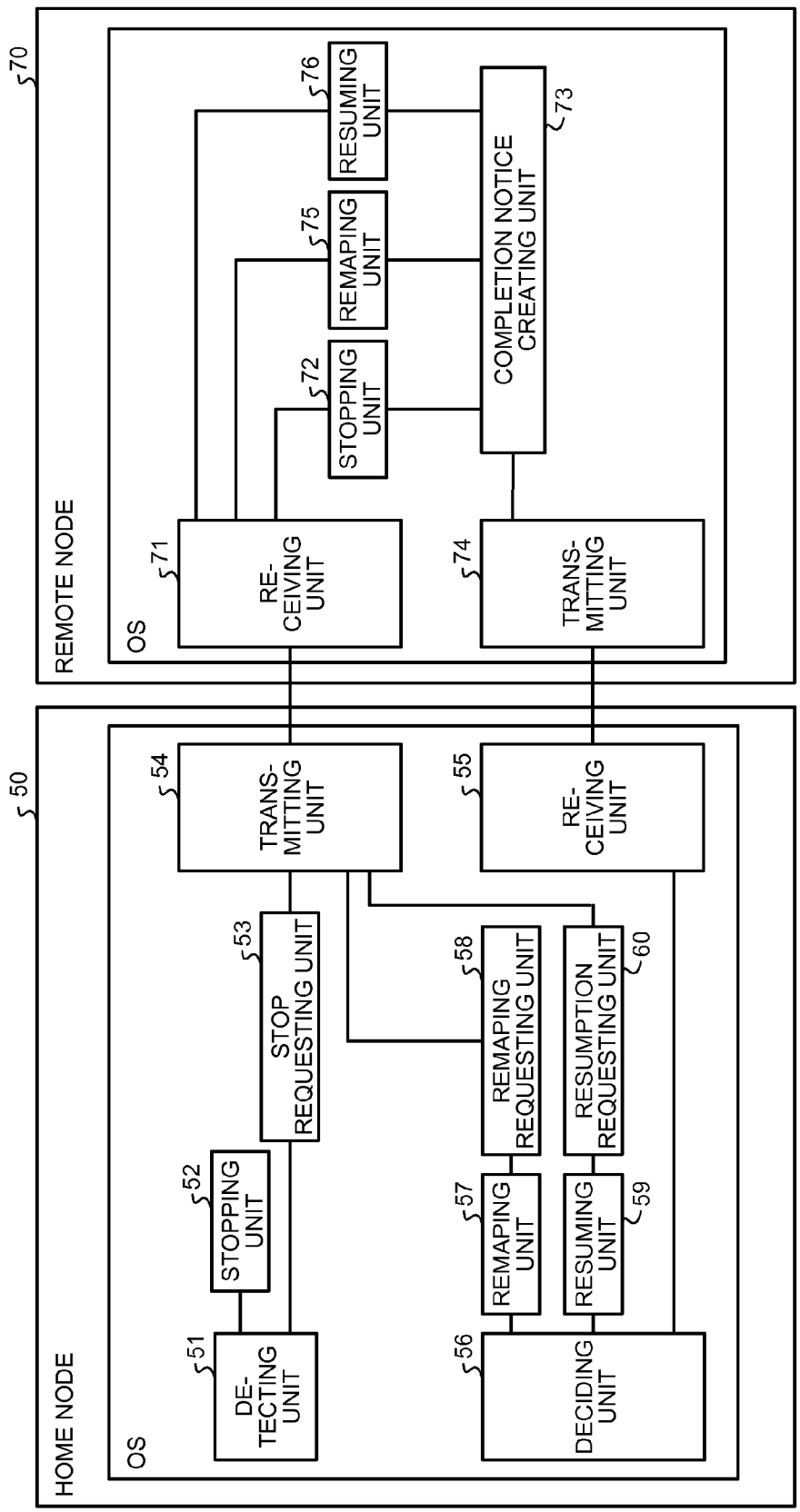
FIG. 28A is a view illustrating an example of a functional configuration of an OS executed by the CPU according to the embodiment.

Hereinafter, processing executed by the OS executed by the CPU 21 will be described. FIG. 28A is a view illustrating an example of a functional configuration of the OS executed by the CPU according to the embodiment. FIG. 28B is a view illustrating an example of a data configuration of a table referred to in processing of the OS. FIGS. 29 to 33, FIG. 36 and FIG. 39 are flowcharts for explaining flows of processings executed by the OS.

FIG. 28A illustrates a function configuration of the OS in a home node 50 and a remote node 70. With an example in FIG. 28A, the home node 50 has a detecting unit 51, a stopping unit 52, a stop requesting unit 53, a transmitting unit 54, a receiving unit 55, a deciding unit 56, a remaping unit 57, a remaping requesting unit 58, a resuming unit 59 and a resumption requesting unit 60. Further, the remote node 70 has a receiving unit 71, a stopping unit 72, a completion notice creating unit 73, a transmitting unit 74, a remaping unit 75 and a resuming unit 76.

Figure 29:
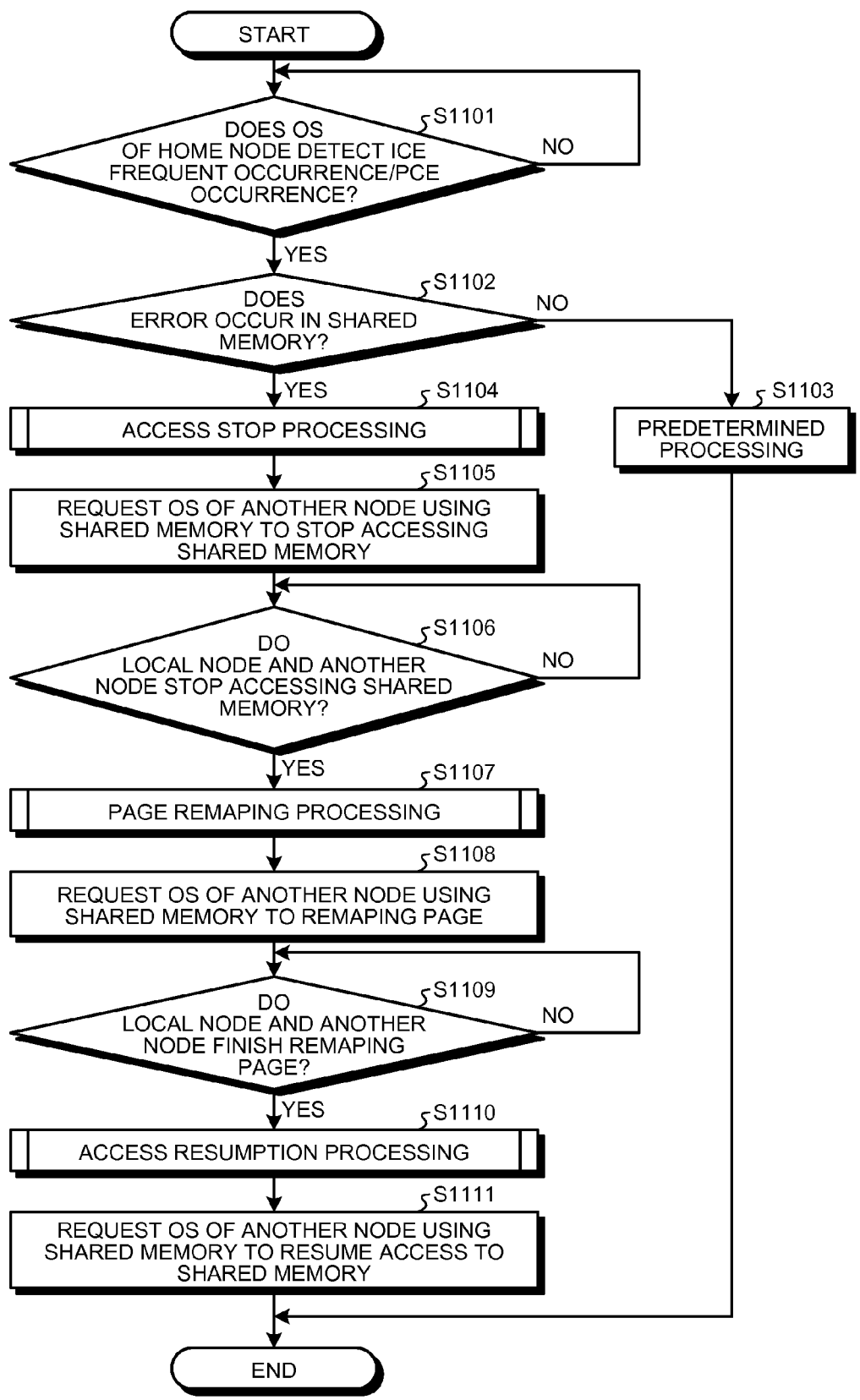
FIG. 29 is a flowchart for explaining a flow of processing executed by the OS.

As illustrated in FIG. 29, the detecting unit 51 decides whether or not an ICE or a PCE occurs by deciding whether or not the physical address of the memory 22 is set to the CE address register 41b (step S1101). When the ICE or the PCE does not occur (No in step S1101), the detecting unit 51 performs processing in step S1101 again. Further, when the ICE or the PCE occurs (Yes in step S1101), the detecting unit 51 decides whether or not the ICE or the PCE occurs in the shared memory (step S1102). For example, the detecting unit 51 decides whether or not the physical address set to the CE address register 41b is an address of the memory area of the shared memory. By this means, the detecting unit 51 can decide whether or not the ICE or the PCE occurs in the shared memory. In addition, when the virtual address is set to the CE address register 41b, the detecting unit 51 refers to the table in which an equation of converting the virtual address into a physical address is registered, calculates the physical address from the virtual address and decides whether or not the physical address is the address of the memory area of the shared memory. Meanwhile, such a table includes an entry which associates and registers information showing an address area, a range of a physical address indicated by the address area, an equation of converting a virtual address into the physical address and an equation of converting the physical address into the virtual address. For example, the detecting unit 51 calculates the physical address from the virtual address referring to the table illustrated in FIG. 28B.

When the ICE or the PCE does not occur in the shared memory (No in step S1102), the detecting unit 51 executes predetermined processing (step S1103), and finishes processing. Meanwhile, the predetermined processing refers to, for example, degenerating or reserving degeneration of a target page. In addition, the memory accessing unit 41 may perform processing of transmitting data to the cache directory managing unit 36 by neglecting occurrence of a CE.

Meanwhile, when an ICE or a PCE occurs in a shared memory (Yes in step S1102), the stopping unit 52 executes access stop processing (step S1104). Further, the stop requesting unit 53 transmits to the transmitting unit 54 an instruction (access stop request) of instructing an OS of another node (remote node 70) using the shared memory to stop accessing the shared memory (step S1105). By this means, the transmitting unit 54 transmits the access stop request to another node using the shared memory. Further, the OS of the remote node 70 which has received the access stop request executes the access stop processing, and stops an access to the shared memory. Furthermore, the OS of the remote node 70 notifies to the home node 50 that the access stop processing for the shared memory is completed. In addition, the transmitting unit 54 transmits the access stop request to all other nodes connected with the local node, or refers to the table illustrated in the example of FIG. 28C, specifies a node using the shared memory and transmits the access stop request to the specified node. The table illustrated in the example of FIG. 28C includes an entry which associates a physical address of a shared memory, a virtual address of the shared memory, a memory length of the shared memory, an identifier of a node using the shared memory and a pointer indicating the next entry.

Subsequently, the deciding unit 56 decides whether or not a local node (home node 50) and the other nodes stop accessing the shared memory (step S1106). When, for example, checking that the stopping unit 52 completes the access stop processing, the deciding unit 56 decides that the local node stops accessing the shared memory. Further, when the receiving unit 55 receives the notice that the access stop processing to the shared memory is completed, the deciding unit 56 decides that another node which has transmitted the notice stops accessing the shared memory.

When deciding that the local node (home node 50) and another node stop accessing the shared memory (Yes in step S1106), the remaping unit 57 executes page remaping processing (step S1107).

Meanwhile, processing content of the page remaping processing will be described with a specific example. For example, according to the page remaping processing, a page including a memory area in which an ICE or a PCE occurs is first divided into a plurality of pages such that the memory area in which the ICE or the PCE occurs is included in the divided page of a minimum size. When, for example, one page has 256 MB, one page (256 MB) including the memory area in which the ICE or the OCE occurs is divided into a plurality of pages as follows such that a page including the memory area in which the ICE or the OCE occurs is included in a page of 8 KB of the minimum size. For example, one page (256 MB) is divided into 103 pages in total of 128 MB (1 page), 8 KB (8 pages), 64 KB (63 pages) and 4 MB (31 pages). By this means, it is possible to suppress the copy amount from 256 KB to 8 KB. This page division processing is performed to reduce a copy processing time, and is not necessarily indispensable processing. That is, this page division processing is not necessary to be performed. Alternatively, only when an inter-node shared memory which can be used (which is not used by the application) has a certain capacity or less or is insufficient, the page division processing may be performed. This is because it is possible to acquire a page of 8 KB even if it is not possible to acquire a page of 256 MB. Further, according to the page remaping processing, a copy destination page is acquired. In addition, only a size of the copy destination page fixed by a system or specified by a user may be acquired upon activation of the OS or activation of an application such that the copy destination page can be acquired without fail. Subsequently, according to the page remaping processing, a page of a page (8 KB) including the memory area in which an ICE or a PCE occurs is copied to the copy destination page. In addition, when the page division processing is not performed, the entire original page such as entire 256 MB is copied with the above-mentioned example. Subsequently, according to the page remaping processing, a new page configuration is set to a management area of the OS.

Subsequently, the remaping requesting unit 58 transmits to the transmitting unit 54 an instruction (page remaping request) of remaping a page to an OS of another node using the shared memory (step S1108). By this means, the transmitting unit 54 transmits the page remaping request to another node using the shared memory. Further, the OS of the remote node 70 which has received the page remaping request executes the page remaping processing, and remapings a page. Further, the OS of the remote node 70 notifies to the home node 50 that the page remaping processing is completed. In addition, the transmitting unit 54 transmits the page remaping request to all other nodes connected to the local node, or refers to the table illustrated in the example in FIG. 28C, specifies a node using the shared memory and transmits the page remaping request to the specified node.

Subsequently, the deciding unit 56 decides whether or not the local node and another node finish remaping a page (step S1109). When, for example, checking that the remaping unit 57 completes the page remaping processing, the deciding unit 56 decides that the local node finishes remaping the page. Further, when the receiving unit 55 receives the notice that the page remaping processing is completed, the deciding unit 56 decides that another node which has transmitted the notice finishes remaping the page.

When deciding that the local node and another node complete remaping the page (Yes in step S1109), the resuming unit 59 executes access resumption processing (step S1110). Further, the resumption requesting unit 60 transmits to the transmitting unit 54 an instruction (access resumption request) of instructing the OS of another node using the shared memory to resume an access to the shared memory (step S1111), and finishes processing. By this means, the transmitting unit 54 transmits the access resumption request to another node using the shared memory. Further, the OS of the remote node 70 which has received the access resumption request executes the access resumption processing, and resumes an access to the shared memory. Furthermore, the OS of the remote node 70 notifies to the home node 50 that the access resumption processing is completed. In addition, the transmitting unit 54 transmits the access resumption request to all other nodes connected to the local node, or refers to the table illustrated in the example of FIG. 28C, specifies the node using the shared memory and transmits the access resumption request to the specified node.

Figure 30:
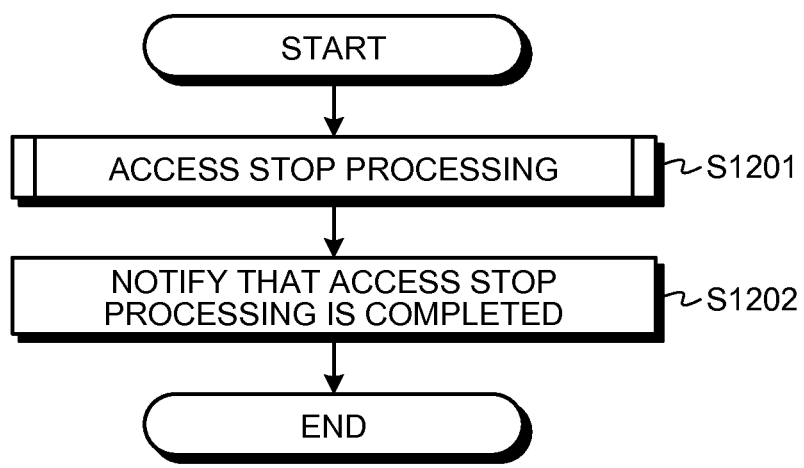
FIG. 30 is a flowchart for explaining a flow of processing executed by the OS.

Next, processing executed by the OS of the remote node 70 which has received the access stop request will be described using FIG. 30. FIG. 30 is a flowchart for explaining processing executed by the OS of a remote node which has received the access stop request. As illustrated in FIG. 30, the stopping unit 72 executes the access stop processing (step S1201). Further, the completion notice creating unit 73 notifies to the transmitting unit 74 that the access stop processing is completed (step S1202), and finishes processing. Meanwhile, the transmitting unit 74 which has received the notice that the access stop processing is completed transmits to the home node 50 a notice that the access stop processing is completed.

Figure 31:
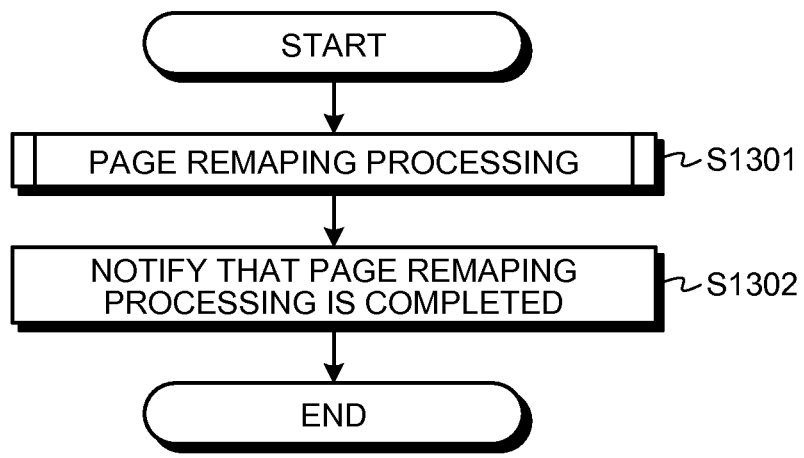
FIG. 31 is a flowchart for explaining a flow of processing executed by the OS.

Next, processing executed by the OS of the remote node 70 which has received the page remaping request will be described using FIG. 31. FIG. 31 is a flowchart for explaining processing executed by the OS of the remote node which has received the page remaping request. As illustrated in FIG. 31, the remaping unit 75 executes page remaping processing (step S1301). According to this page remaping processing, a new page configuration (new correspondence between VA and PA) is set to a management area of the OS. Further, the completion notice creating unit 73 notifies to the transmitting unit 74 that the page remaping processing is completed (step S1302), and finishes processing. Meanwhile, the transmitting unit 74 which has received the notice that the page remaping processing is completed transmits to the home node 50 a notice that the page remaping processing.

Figure 32:
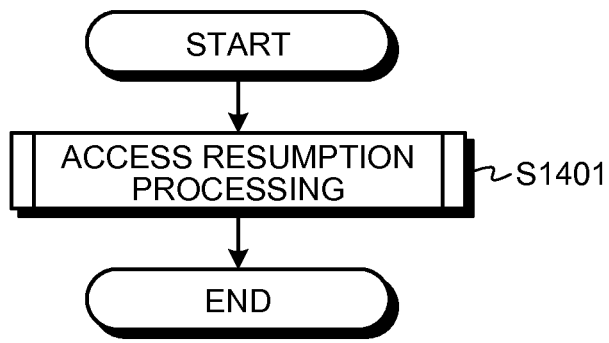
FIG. 32 is a flowchart for explaining a flow of processing executed by the OS.

Next, processing executed by the OS of the remote node 70 which has received the access resumption request will be described using FIG. 32. FIG. 32 is a flowchart for explaining processing executed by the OS of the remote node which has received the access resumption request. As illustrated in FIG. 32, the resuming unit 76 executes the access resumption processing (step S1401), and finishes processing. In addition, the completion notice creating unit 73 can also notify to the transmitting unit 74 that the access stop processing is completed after processing in step S1401. Meanwhile, the transmitting unit 74 which has received a notice that the access stop processing is completed transmits to the home node 50 a notice that the access stop processing is completed.

Figure 33:
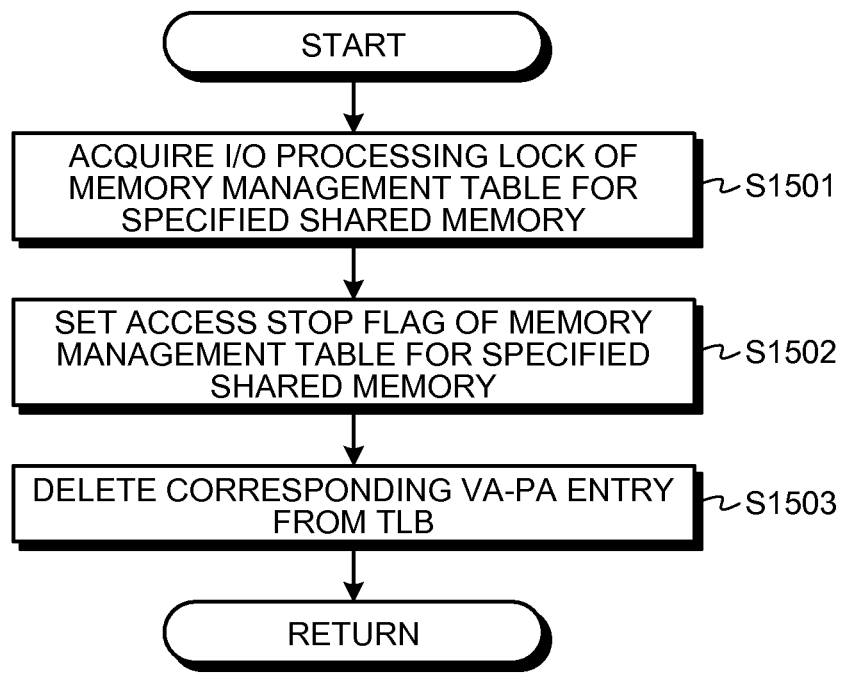
FIG. 33 is a flowchart for explaining a flow of processing executed by the OS.

Next, a flow of the access stop processing in step S1104 in FIG. 29 and step S1201 in FIG. 30 will be described using FIG. 33. FIG. 33 is a flowchart for explaining the access stop processing. As illustrated in FIG. 33, the stopping unit 52 (stopping unit 72) acquires an I/O processing lock of a memory management table (page management table) for the specified shared memory (step S1501). By this means, an access to the I/O device is suspended.

Meanwhile, an example of a data configuration of the memory management table will be described. FIG. 34 is a view illustrating an example of the data configuration of the memory management table. The memory management table in the example of FIG. 34 includes an item of "access stop flag" in which a value indicating an on/off state of an access stop flag is registered and an item of "I/O processing lock" in which a value indicating a state of the I/O processing lock is registered. Further, the memory management table in the example in FIG. 34 includes an item of "pointer to another page management table" in which a pointer to another page management table is registered, and an item of "pointer to address conversion table" in which a pointer to an address conversion table is registered. Furthermore, the memory management table in the example in FIG. 34 includes an item of "other management information" in which various types of items of other management information are registered.

Still further, the address conversion table indicated by "pointer to address conversion table" registered in the memory management table will be described. FIG. 35 is a view illustrating an example of a data configuration of the address conversion table. The address conversion table in the example of FIG. 35 includes an item of "PA" in which the physical address of the memory 22 is registered, an item of "VA" in which a virtual address associated with the physical address is registered, and an item of "area length" in which a size of a memory area indicated by the physical address of the memory 22 is registered. Further, the address conversion table in the example in FIG. 35 includes an item of "pointer to page management table" in which a pointer to the page management table is registered, and an item of "pointer to another address conversion table" in which a pointer to another address conversion table is registered. Furthermore, the address conversion table in the example in FIG. 35 includes an item of "other management information" in which various types of items of other management information are registered.

Still further, the stopping unit 52 (stopping unit 72) sets an access stop flag of the memory management table to the specified shared memory (step S1502). By this means, an access to the shared memory is stopped. Subsequently, the stopping unit 52 (stopping unit 72) refers to the address conversion table, and performs the following processing when an entry which associates the virtual address of the shared memory and the physical address is registered in the TLB 35*a*. That is, the stopping unit 52 (stopping unit 72) deletes the entry from the TLB 35*a* (step S1503), and finishes processing.

Meanwhile, when the entry which associates the virtual address of the shared memory and the physical address is deleted from the TLB 35*a*, if the application accesses the shared memory, a TLB miss occurs. With the present example, when such a TLB miss occurs, TLB miss processing is executed as interruption processing, and an access of the application to the shared memory is prevented.

Figure 36:
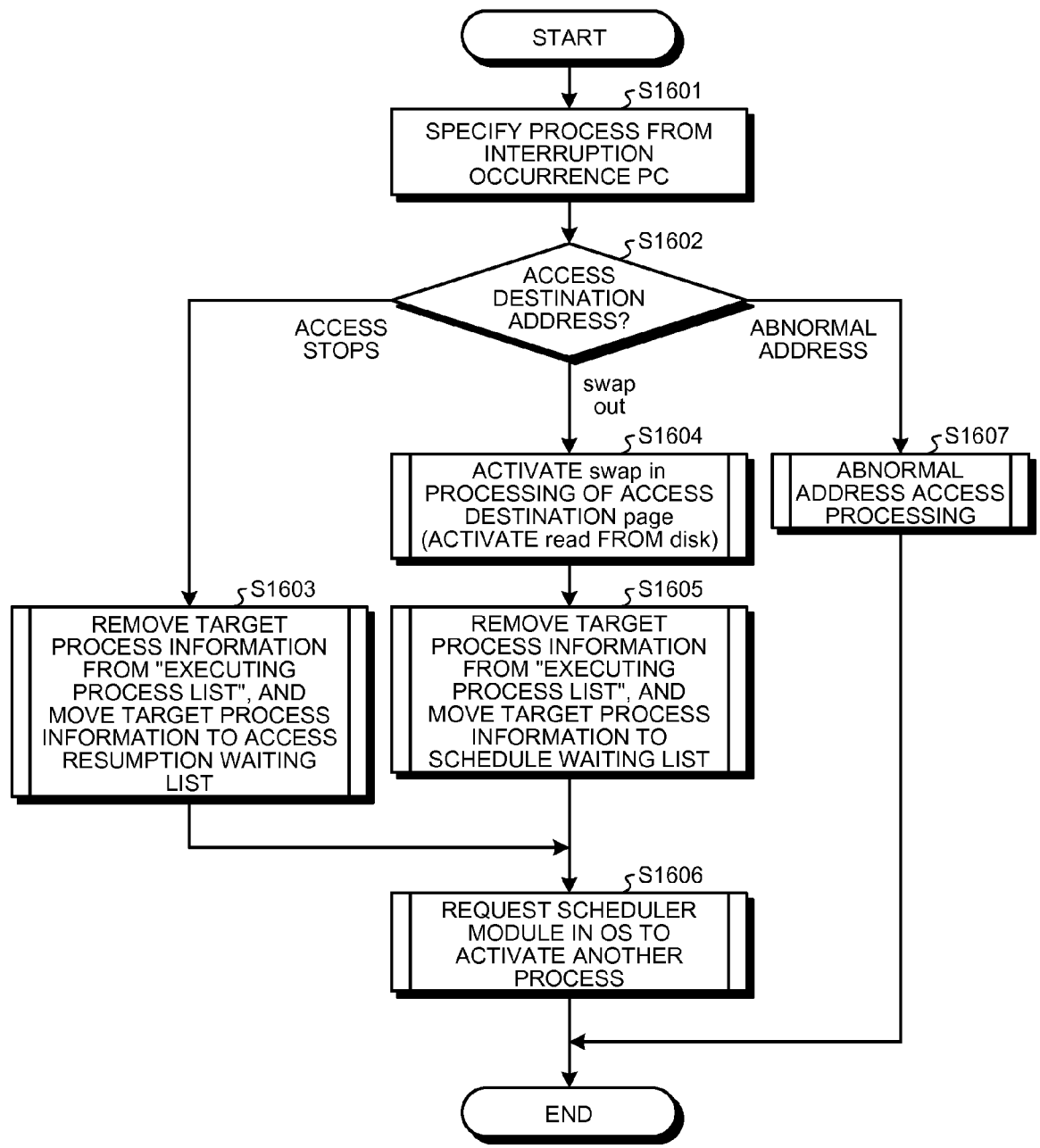
FIG. 36 is a flowchart for explaining a flow of processing executed by the OS.

FIG. 36 is a flowchart for explaining a flow of the TLB miss processing. As illustrated in FIG. 36, the OS specifies process from a program counter in which interruption occurs (step S1601). Subsequently, the OS searches for the address conversion table illustrated in FIG. 35 from an occurrence address. When a corresponding address conversion table is found, a page management table indicated by a pointer of a page management table in this address conversion table is checked. Whether a memory area indicated by an access destination address is a memory area to which an access is stopped, a memory area in which swap out occurs (in which information that swap out has been already performed is recorded) or a memory area in which abnormality occurs (a memory area without an address conversion table) is decided (step S1602).

When an access stop flag is on, that is, when the memory area is the memory area for which an access is stopped (step S1602: the access is stopped), the OS removes target process information from an executing process list, and moves the executing process list to the access resumption waiting list (step S1603). Meanwhile, an example of a data configuration of the access resumption waiting list will be described. FIG. 37 is a view illustrating an example of the data configuration of the access resumption waiting list. The access resumption waiting list illustrated in the example of FIG. 37 includes an item of "process identifier" in which an identifier for identifying process is registered, and item of "process recovery information" in which a pointer indicating an area in which register information such as a resumed program counter is evacuated is registered. Further, the access resumption waiting list illustrated in the example of FIG. 37 includes an item of "resumption waiting shared memory address" in which a virtual address of a resumption waiting shared memory is registered, and an item of "pointer to next list" in which a pointer to the next list is registered.

Subsequently, the OS requests a scheduler module in the OS to actuate another process (step S1606), and finishes processing.

Further, in case of a memory area in which swap out occurs (step S1602: swap out), the OS actuates swap in processing of an access destination page (step S1604). Furthermore, the OS removes the target process information from the executing process list and moves the target process information to the schedule waiting list (step S1605), and proceeds to step S1606. Meanwhile, an example of a data configuration of the scheduler waiting list will be described. FIG. 38 is a view illustrating an example of the data configuration of the access resumption waiting list. The access resumption waiting list illustrated in the example of FIG. 38 includes an item of "process identifier" in which an identifier for identifying process is registered, and an item of "process recovery information" in which a pointer indicating an area in which register information such as a resumed program counter is evacuated is registered. Further, the access resumption waiting list illustrated in the example of FIG. 38 includes an item of "pointer to next list" in which a pointer to the next list is registered.

Furthermore, in case of a memory area in which abnormality occurs (step S1602: abnormal address), the OS executes "abnormal address access processing" which causes an access error in accessing process (step S1607), and finishes processing.

Figure 39:
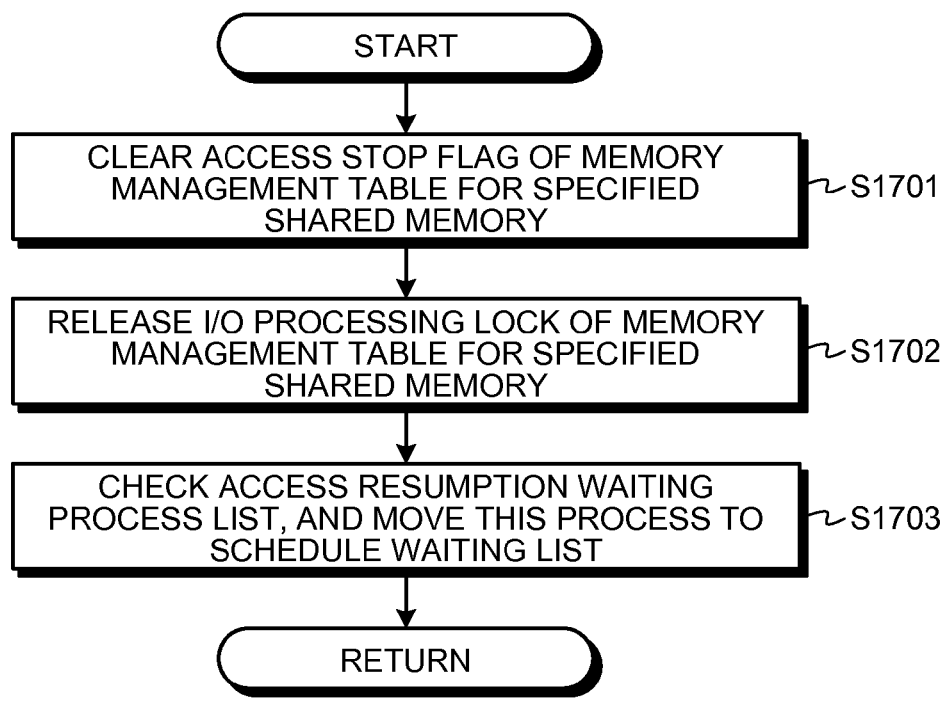
FIG. 39 is a flowchart for explaining a flow of the processing executed by the OS.

Next, a flow of the access resumption processing in step S1110 in FIG. 29 and step S1401 in FIG. 32 will be described using FIG. 39. FIG. 39 is a flowchart for explaining the access resumption processing. As illustrated in FIG. 39, the resuming unit 59 (resuming unit 76) clears an access stop flag of the memory management table for the specified shared memory (step S1701). By this means, the CPU resumes an access to the shared memory.

Further, the resuming unit 59 (resuming unit 76) releases an I/O processing lock of the memory management table for the specified shared memory (step S1702). By this means, the I/O resumes an access. Subsequently, the resuming unit 59 (resuming unit 76) checks an access resumption waiting process list and moves the process to the schedule waiting list (step S1703), and finishes processing.

In addition, processing executed by, for example, the stopping unit 52, the stopping unit 72, the resuming unit 59 and the resuming unit 76 may be performed by the process. FIG. 40 is a view illustrating an example of a functional configuration of the OS and process executed by the CPU according to the embodiment. An example of FIG. 40 differs from the example of FIG. 28A in that the process includes the stopping unit 52, the stopping unit 72, the resuming unit 59 and the resuming unit 76 compared to the example of FIG. 28A. Meanwhile, the OS creates information which associates in advance a physical address of the shared memory and various types of event handlers. This information is created when, for example, the application requests the OS to associate "address of shared memory", "event type which needs to be received" (access stop request and access resumption request) and "address of event handler program" related to this event. The application usually knows only "virtual address (VA) of shared memory", and does not know a physical address (PA).

Then, the OS side converts the VA into the PA, and records the PA. When an event (for example, access stop request) related to this PA occurs, the event handler program associated with this event and the PA is activated. (A start address of the event handler program is registered, and a program operation is started from this start address).

Further, when the detecting unit 51 detects an ICE or a PCE, the stopping unit 52 and the stopping unit 72 refer to the created information, and reads a first event handler associated with the physical address of the shared memory set to the CE address register 41b. More specifically, when an event takes place while the application is operating, register information which is operating at this point of time is evacuated to a stack, and the operation of the event handler program is started from the start address of the first event handler program. Then, the first event handler stops every access (read/write and I/O access) to the shared memory from the application. A method of stopping the access includes (1) preparing and creating in a program "access stop flag for shared memory" such that the application continues an access only when this flag is not on. The method also includes turning this flag on in the first event handler, and (2) stopping the operation of the application in the first event handler and stopping every process of application processing.

Further, when the deciding unit 56 decides that the local node and another node remaps a page, the resuming unit 59 refers to the created information, and reads a second event handler associated with the physical address of the shared memory set to the CE address register 41b. Then, the application (process) resumes all stopped accesses (read/write and I/O access) to the specified shared memory. Further, when receiving the access resumption request, the resuming unit 76 refers to the created information, and reads the second event handler associated with the physical address of the shared memory set to the CE address register 41b. More specifically, when an event takes place while the application is operating, register information which is operating at this point of time is evacuated to a stack, and an operation of the event handler program is started from the start address of the second event handler program. Then, the second event handler resumes all stopped accesses to the specified shared memory from the application (process). A method of resuming an access includes (1) preparing and creating in a program "access stop flag to shared memory" such that the application continues an access only when this flag is not on. The method also includes a turning this flag off in the second event handler, and (2) because the application stops operating in the first event handler, rewriting a PC and returning the application processing from the first event handler. In addition, an event handler in the local node directly invoked from the resuming unit 59 and an event handler on another node invoked from the resuming unit 76 may be a program including a single instruction sequence or a program including different instruction sequences. (This is a programmer's preference, and both can be implemented).

Effect of Embodiment

As described above, the information processing system 1 has a plurality of building blocks which each have memories, and an XB 2 which connect between a plurality of building blocks. At least one building block 10 of a plurality of building blocks performs the following processing of data which is included in a memory of the building block 10 or another building block, and which is stored in a shared memory area which the building block 10 or another building block accesses. That is, the building block 10 detects an ICE which occurs over a predetermined number of times within a predetermined time, or detects a PCE which occurs at a single location in the shared memory area. When detecting an error, the building block 10 performs control to prevent the building block 10 and another building block from accessing the shared memory. The building block 10 recovers data in a memory different from the shared memory area. The building block 10 notifies the different memory area to another building block. The building block 10 performs control to resume an access from the building block 10 or another building block to the shared memory. Consequently, the information processing system 1 can suppress a likelihood that the information processing system 1 goes down.

Further, the information processing system 1 decides whether an access target is a shared area or a local area based on the received physical address, and can keep a high security level for kernel data or user data stored in the local area. Furthermore, the information processing system 1 makes all memories cacheable, and can easily cover up latency upon a memory access.

Still further, the CPU 21 accesses the shared area of a memory which another CPU accesses according to the same method as an access to the memory 22. That is, even when there is the access target memory area on the memory 22 or on another memory, the computing unit 31 of the CPU 21 only needs to output a virtual address.

Hence, the CPU 21 can easily access the shared area without executing, for example, processing such as exclusive control of the I/O and a programming and, consequently, improve memory access performance. Further, the CPU 21 can adequately use the shared memory without modifying a program or an OS to execute and, as a result, execute prefetch processing similar to a conventional method, so that it is possible to improve memory access performance.

Furthermore, the CPU 21 returns a denial response when a memory access target from another CPU is an access to a local area. Consequently, the information processing system 1 prevents an access to an area other than the shared area and, as a result, can prevent an error.

Further, the cache directory managing unit 36 converts a physical address into a CPUID stored in association with the node map 34 using the node map 34. Consequently, the CPU 21 can identify the CPU which accesses a memory to which an access target physical address is sorted.

Further, the CPU 21 controls cache coherence using a directory for managing the CPU which caches data stored in the memory 22. Consequently, even when the number of CPUs of the information processing system 1 increases, the information processing system 1 can efficiently keep cache coherence without increasing traffic of the XB 2.

More specifically, in the information processing system 1, communication between CPUs is limited between a remote CPU and a home CPU or between a remote CPU, a home CPU and a local CPU which caches updated data. Consequently, the information processing system 1 can efficiently keep cache coherence.

Although the example of the present invention has been described, various different examples may be implemented in addition to the above example. Hereinafter, other embodiments will be described.

(1) Regarding Building Block

The above information processing system 1 has the building blocks 10 to 10e which have four CPUs. However, the example is by no means limited to this, and the building blocks 10 to 10e can have an arbitrary number of CPUs and memories to which each CPU accesses. Further, the CPU and the memory do not need to be associated on a one to one basis, and the CPU which directly accesses the memory may be part of entirety.

(2) Regarding Packet Transmitted by CPU

The above CPU 21 transmits a packet which includes a CPUID and a PA (Physical Address) as a memory access request. However, the example is by no means limited to this. That is, if the CPU 21 can uniquely identify a CPU which accesses an access target memory, the CPU 21 may output a packet which stores arbitrary information.

Further, for example, the CPU 21 may convert the CPUID into a VC (Virtual Connection) ID, and store a VCID. Furthermore, the CPU 21 may store information such as a length indicating a data length, in a packet.

(3) Regarding Order (Instruction) Issued by CPU

As described above, each of the CPUs 21 to 21c issues a request or an order, and keeps cache coherence. However, the above request or order is consistently an example, and, for example, the CPUs 21 to 21c may issue CAS (Compare AndSwap) instructions.

Thus, when the CPUs 21 to 21c issue CAS instructions, even if contention of exclusive control frequently occurs between a plurality of CPUs, processing is performed on the cache of each CPU. As a result, the CPUs 21 to 21c can prevent delay due to occurrence of a memory access, and prevent transaction between CPUs from being crowded.

(4) Regarding Control Through Hypervisor

An example has been described where the OS accesses the address converting unit 35 which is hardware in the information processing system 1. However, the example is by no means limited to this, and, for example, a hypervisor (HVP) which operates a virtual machine may access the address converting unit 35.

That is, in the node in which the hypervisor operates, the OS requests the hypervisor to perform an operation without directly operating hardware resources of the CPUs 21 to 21c such as caches and MMUs. Thus, when each of the CPUs 21 to 21c is controlled through the hypervisor, each of the CPUs 21 to 21c converts a virtual address into a real address (RA) and then converts the real address into a physical address.

Further, in the node in which the hypervisor operates, the HPV is interrupted without directly interrupting the OS according to interruption processing. In this case, the hypervisor performs interruption by reading an interruption processing handler of the OS. In addition, the processing executed by the above hypervisor is known processing executed to operate the virtual machine.

(5) Processing Using Partition

In the above information processing system 1, each of the CPUs 21 to 21c transmits a memory access using one node map. However, the example is by no means limited to this. For example, each of the building blocks 10 to 10e may operate as a plurality of groups of nodes, and configure one virtual partition which operates single firmware (hypervisor) per node group.

In this case, each of the CPUs 21 to 21c includes a node map indicating an access destination CPU and a node map indicating a CPU in a single virtual partition. Thus, each of the CPUs 21 to 21c includes a node map indicating a CPU included in the single virtual partition, and can identify a transfer range of a special packet which may not be transferred beyond a virtual partition such as an error occurrence notice, a down request or a reset request packet.

(6) Control Through Service Processor

An example has been described with the above information processing system 1 where the service processor 24 accesses the node map 34 which is hardware. However, the example is by no means limited to this, and a unit other than the service processor 24 may be configured to access the node map 34. For example, basic firmware BIOS (Basic Input/Output System) which are operated by one or all of CPUs on the CPUs 21 to 21c or the HPV may be configured to access the node map 34.

According to an embodiment, it is possible to suppress a likelihood that an information processing apparatus goes down.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
    a plurality of nodes that each comprise a storage device; and
    an interconnect that connects between the plurality of nodes,
    wherein at least one node of the plurality of nodes comprises:
        a detecting unit that detects a correctable error in data stored in a shared memory area included in a storage device of the one node or other node, the shared memory area being an area to which the one node and the other node access, and the correctable error being (i) an error which occurs more than a predetermined number of times within a predetermined time period or (ii) an error which occurs at a single location in the shared memory area;
        a prevention control unit that, when the detecting unit detects the correctable error, performs control to prevent the one node and the other node from accessing the shared memory area by deleting, from first address converting information which associates a virtual address used for memory accesses of the one node and the other node with a physical address which indicates a data storing area in the storage device of the one node, an entry which associates a virtual address with a physical address in the shared memory area in which the correctable error is detected and by transmitting, to the other node, an instruction to delete the entry from second address converting information which associates the virtual address used for the memory accesses of the one node and the other node with a physical address which indicates a data storing area in the storage device of the other node;
        a recovering unit that recovers the data stored in the shared memory area in a memory area different from the shared memory area;
        a notifying unit that notifies information about the different memory area to the other node; and
        a resumption control unit that performs control to resume the access to the recovered data from the one node and the other node.

2. The information processing apparatus according to claim 1, wherein the prevention control unit transmits to the other node an instruction for stopping an access to the shared memory from an application executed by the other node, and stops an access to the shared memory from an application executed by the one node.

3. The information processing apparatus according to claim 1, wherein the recovering unit acquires a page of other memory area to copy a page including the error of the shared memory area, and copies data stored in an area of the page including the error of the shared memory area to an area of the page of the other memory area.

4. The information processing apparatus according to claim 3, wherein the recovering unit divides the page of the shared memory area into a plurality of pages, and copies data stored in an area of a divided page including the error to an area of the page of the other memory area.

5. The information processing apparatus according to claim 4, wherein,
    when the recovering unit divides the page of the shared memory area into the plurality of pages that have different sizes, the recovering unit includes the area of the divided page including the error into the divided page of a minimum size among the plurality of pages.

6. The information processing apparatus according to claim 3, wherein, when acquiring the page of the other memory area, if an acquirable page volume is a predetermined volume or less or acquisition of the page of the other memory area fails, the recovering unit divides the page of the shared memory area.

7. The information processing apparatus according to claim 3, wherein, when an OS (Operating System) is activated in a local node or an application using a shared memory of the local node or other node is activated, the recovering unit secures in advance an area of a predetermined size which can be used as the other memory area.

8. The information processing apparatus according to claim 1, wherein
    the detecting unit detects a plurality of correctable errors, and
    the prevention control unit performs the control to prevent the one node and the other node from accessing the shared memory area when an average value of an occurrence count of the plurality of correctable errors per unit time exceeds a threshold.

9. The information processing apparatus according to claim 8, wherein
    the detecting unit detects a correctable error that occurs after a predetermined time from a final occurrence time of a previous correctable error as a first correctable error in the plurality of correctable errors.

10. An information processing apparatus comprising:
    a plurality of nodes that each comprise a storage device; and
    an interconnect that connects between the plurality of nodes,
    wherein at least one node of the plurality of nodes comprises:
        an access control unit that controls an access to the storage device of the one node, and comprises an error detecting unit that detects an error of data read from the storage device; and
        a processing unit that performs a process comprising,
            preventing an access to a shared memory area from the one node and other node by deleting, from first address converting information which associates a virtual address used for memory accesses of the one node and the other node with a physical address which indicates a data storing area in the storage device of the one node, an entry which associates a virtual address with a physical address in the shared memory area in which a correctable error is detected and by transmitting, to the other node, an instruction to delete the entry from second address converting information which associates the virtual address used for the memory accesses of the one node and the other node with a physical address which indicates a data storing area in the storage device of the other node, when the error detecting unit detects the correctable error of data stored in the shared memory area, the shared memory area being included in the storage device of the one node and accessed by the one node and the other node, the correctable error being (i) an error which occurs more than a predetermined number of times within a predetermined time period or (ii) an error which occurs at a single location in the shared memory area;

recovering the data stored in the shared memory area in a memory area different from the shared memory area and included in the storage device of the one node;

notifying information about the different memory area to the other node; and resuming the access to the recovered data from the one node and the other node.

11. A non-transitory computer-readable recording medium having stored therein a control program for causing at least one node of a plurality of nodes in an information processing apparatus to execute a process, the information processing apparatus comprising the plurality of nodes each comprising a storage device, and an interconnect connecting between the plurality of nodes, the process comprising:

detecting a correctable error in data stored in a shared memory area included in a storage device of the one node or other node, the shared memory area being an area to which the one node and the other node access, and the correctable error being (i) an error which occurs more than a predetermined number of times within a predetermined time period or (ii) an error which occurs at a single location in the shared memory area;

when the correctable error is detected, performing control to prevent the one node and the other node from accessing the shared memory area by deleting, from first address converting information which associates a virtual address used for memory accesses of the one node and the other node with a physical address which indicates a data storing area in the storage device of the one node, an entry which associates a virtual address with a physical address in the shared memory area in which the correctable error is detected and by transmitting, to the other node, an instruction to delete the entry from second address converting information which associates the virtual address used for the memory accesses of the one node and the other node with a physical address which indicates a data storing area in the storage device of the other node;

recovering the data stored in the shared memory area in a memory area different from the shared memory area and included in the storage device of the one node;

notifying information about the different memory area to the other node; and performing control to resume the access to the recovered data from the one node and the other node.

12. A control method performed by at least one node of a plurality of nodes in an information processing apparatus, the information processing apparatus comprising the plurality of nodes each comprising a storage device, and an interconnect connecting between the plurality of nodes, the control method comprising:

detecting a correctable error in data stored in a shared memory area included in a storage device of the one node or other node, the shared memory area being an area to which the one node and the other node access, and the correctable error being (i) an error which occurs more than a predetermined number of times within a predetermined time period or (ii) an error which occurs at a single location in the shared memory area;

when the correctable error is detected, performing control to prevent the one node and the other node from accessing the shared memory area by deleting, from first address converting information which associates a virtual address used for memory accesses of the one node and the other node with a physical address which indicates a data storing area in the storage device of the one node, an entry which associates a virtual address with a physical address in the shared memory area in which the correctable error is detected and by transmitting, to the other node, an instruction to delete the entry from second address converting information which associates the virtual address used for the memory accesses of the one node and the other node with a physical address which indicates a data storing area in the storage device of the other node;

recovering the data stored in the shared memory area in a memory area different from the shared memory area;

notifying information about the different memory area to the other node; and performing control to resume the access to the recovered data from the one node and the other node.

* * * * *